(12) United States Patent
Gentles et al.

(10) Patent No.: US 10,510,153 B1
(45) Date of Patent: *Dec. 17, 2019

(54) CAMERA-LEVEL IMAGE PROCESSING

(71) Applicant: Amazon Technologies, Inc., Seattle, WA (US)

(72) Inventors: Alexander Bruce Gentles, Brampton (GB); Naushirwan Navroze Patuck, Cambridge (GB); Christopher Hong-Wen Tserng, Plano, TX (US); Vinod Kancharla Prasad, Monte Sereno, CA (US); Reto Koradi, San Jose, CA (US); Guhan Lakshminarayanan, Grapevine, TX (US); Kunal Patel, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,035

(22) Filed: Jun. 26, 2017

(51) Int. Cl.
*G06T 7/44* (2017.01)
*G06T 7/90* (2017.01)
(Continued)

(52) U.S. Cl.
CPC .............. *G06T 7/44* (2017.01); *G06F 3/0412* (2013.01); *G06T 7/90* (2017.01); *G06T 2207/20201* (2013.01); *H04N 5/343* (2013.01)

(58) Field of Classification Search
CPC .......... H04N 7/147; H04N 7/15; H04N 19/17; H04N 19/115; H04N 5/33; H04N 7/152; H04N 19/0009; H04N 19/00157; H04N 19/0023; H04N 19/0026; H04N 19/124; H04N 19/14; H04N 19/162; H04N 5/23248; H04N 9/045; H04N 5/3572; H04N 5/23229; H04N 5/23254; H04N 5/23267;
(Continued)

(56) References Cited

U.S. PATENT DOCUMENTS

| 5,978,505 A * | 11/1999 | Sutton | ........................ G06T 5/20 |
| | | | 382/156 |
| 7,773,127 B2 * | 8/2010 | Zimmer | ................... H04N 1/56 |
| | | | 348/223.1 |

(Continued)

OTHER PUBLICATIONS

Christian, Andrew Dean, et al., Pending U.S. Appl. No. 15/188,581, entitled "Knight—Low Bandwidth Video"; filed Jun. 21, 2016.
(Continued)

*Primary Examiner* — Aklilu K Woldemariam
(74) *Attorney, Agent, or Firm* — Pierce Atwood LLP

(57) ABSTRACT

Devices, systems and methods are disclosed for performing image processing at a camera-level. For example, a camera service may run on top of a camera hardware abstraction layer (HAL) and may be configured to perform image processing such as applying a blurring algorithm, applying a color filter and/or other video effects. An application may pass metadata to the camera service via an application programming interface (API) and the camera service may use the metadata to determine parameters for the image processing. The camera service may apply the blurring algorithm for a first period of time before transitioning to unblurred image data over a second period of time.

21 Claims, 21 Drawing Sheets

(51) Int. Cl.
*G06F 3/041* (2006.01)
*H04N 5/343* (2011.01)

(58) Field of Classification Search
CPC .... H04N 1/407; H04N 1/4092; H04N 19/132; H04N 1/32309; H04N 19/182; G06T 3/4015; G06T 7/90; G06T 2207/10024; G06T 2207/20072; G06T 7/80; G06T 2207/30216; G06T 5/005; G06T 7/408; G06T 11/60; G06T 2207/10012; G06T 2207/10028; G06T 2215/16; G06T 7/586; G06T 17/10; G06T 5/20; G06T 15/50; G06T 2207/20192; G06T 2207/20201; G06T 5/002; G06T 2207/20208; G06T 2207/20216; G06T 2207/20221; G06T 5/003; G06T 5/009; G06T 5/50; G06T 1/0007; G06T 2207/20164; A61B 2562/0204; A61B 2562/0219; A61B 2562/0238; A61B 2562/0247; A61B 2562/04; A61B 3/0008; A61B 3/0025; A61B 3/0033; A61B 3/005; A61B 3/0058; A61B 3/0091; A61B 3/022; A61B 3/024; A61B 3/00; G03B 17/561; G06K 9/00221; G06K 9/6202; G06F 17/153
USPC .......... 382/264, 162, 260, 103, 279; 348/14, 348/246, 247, 241, 223, 81, 273
See application file for complete search history.

(56) References Cited

U.S. PATENT DOCUMENTS

| | | | |
|---|---|---|---|
| 8,773,498 B2 | 7/2014 | Lindbergh | |
| 8,922,662 B1* | 12/2014 | Fu | H04N 5/23264 348/208.12 |
| 2002/0050518 A1* | 5/2002 | Roustaei | G06K 7/10544 235/454 |
| 2002/0176113 A1* | 11/2002 | Edgar | G06T 5/004 358/3.27 |
| 2005/0030393 A1* | 2/2005 | Tull | G06T 1/0007 348/241 |
| 2007/0147510 A1* | 6/2007 | Asad | H04N 9/68 375/240.18 |
| 2008/0152248 A1* | 6/2008 | Kelly | H04N 5/3572 382/260 |
| 2008/0250094 A1* | 10/2008 | Chakravarthula | G06F 17/153 708/520 |
| 2008/0266413 A1* | 10/2008 | Cohen | G06T 5/20 348/222.1 |
| 2009/0216769 A1* | 8/2009 | Bellwood | G06F 21/10 |
| 2009/0217343 A1* | 8/2009 | Bellwood | G06F 21/10 726/1 |
| 2010/0053368 A1* | 3/2010 | Nanu | G06K 9/00248 348/224.1 |
| 2010/0245636 A1* | 9/2010 | Kumar | G06T 3/4015 348/273 |
| 2011/0102643 A1* | 5/2011 | Nanu | G06K 9/00248 348/241 |
| 2011/0228075 A1* | 9/2011 | Madden | G03B 15/05 348/81 |
| 2012/0026357 A1* | 2/2012 | Katagairi | H04N 5/33 348/223.1 |
| 2012/0233841 A1* | 9/2012 | Stein | G03B 17/02 29/428 |
| 2013/0142450 A1* | 6/2013 | Doyle | H04N 1/40062 382/275 |
| 2013/0182061 A1* | 7/2013 | Stedman | H04N 19/124 348/14.03 |
| 2013/0258044 A1* | 10/2013 | Betts-Lacroix | H04N 13/243 348/36 |
| 2014/0267575 A1 | 9/2014 | Eisenberg | |
| 2014/0368604 A1 | 12/2014 | Lalonde et al. | |
| 2016/0007047 A1 | 1/2016 | Hosseini | |
| 2016/0261765 A1* | 9/2016 | Roberts | H04N 1/32352 |
| 2016/0270656 A1* | 9/2016 | Samec | A61B 3/085 |
| 2017/0061635 A1* | 3/2017 | Oberheu | G06T 7/586 |
| 2017/0195596 A1* | 7/2017 | Vogelsang | H04N 5/347 |
| 2017/0337693 A1* | 11/2017 | Baruch | G06T 7/168 |

OTHER PUBLICATIONS

Shutterstock Support; "How to Blur Part of a Video"; https://www.shutterstock.com/support/article/how-to-blur-part-of-a-video; 2003-2016 Shutterstock, Inc.; 4 pages.

Graphic Design; "I want to blur out a part of a video"; https://graphicdesign.stackexchange.com/questions/33804/i-want-to-blur-out-a-part-of-a-video; site design / logo © 2017 Stack Exchange Inc.; 2 pages.

\* cited by examiner

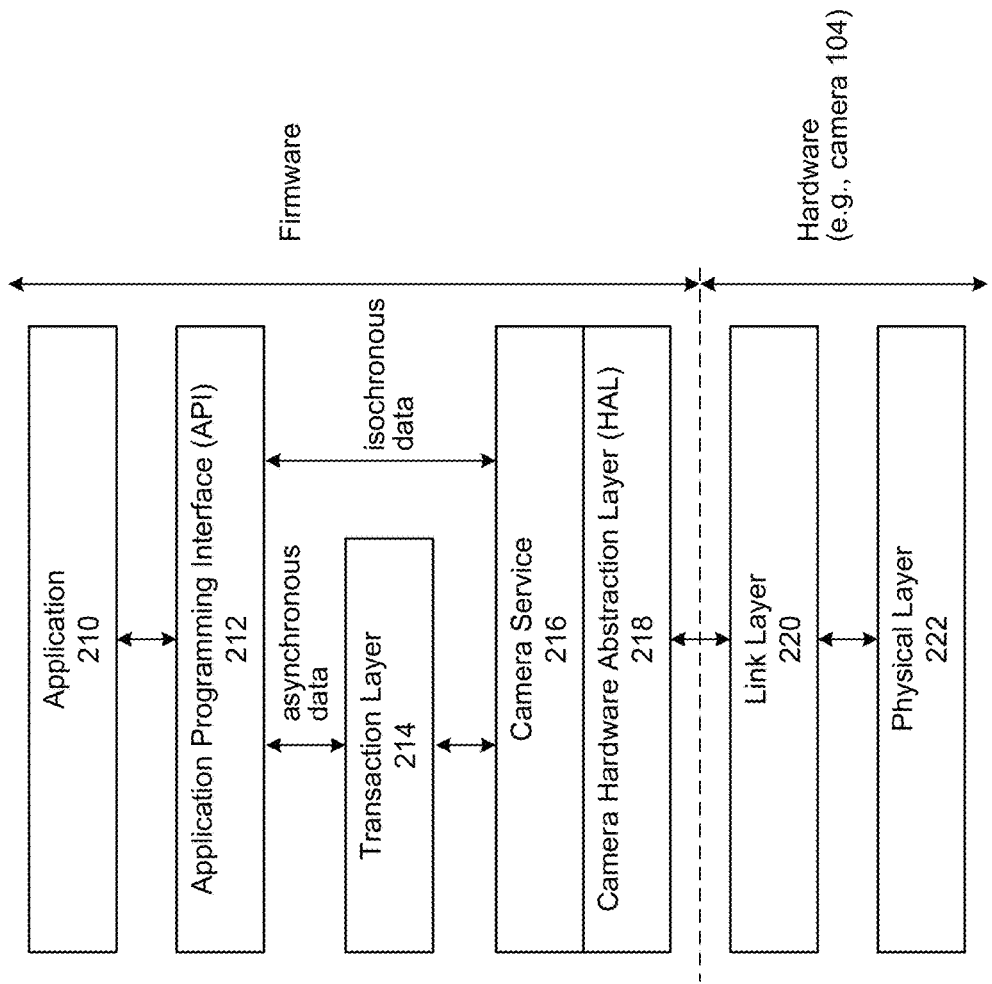

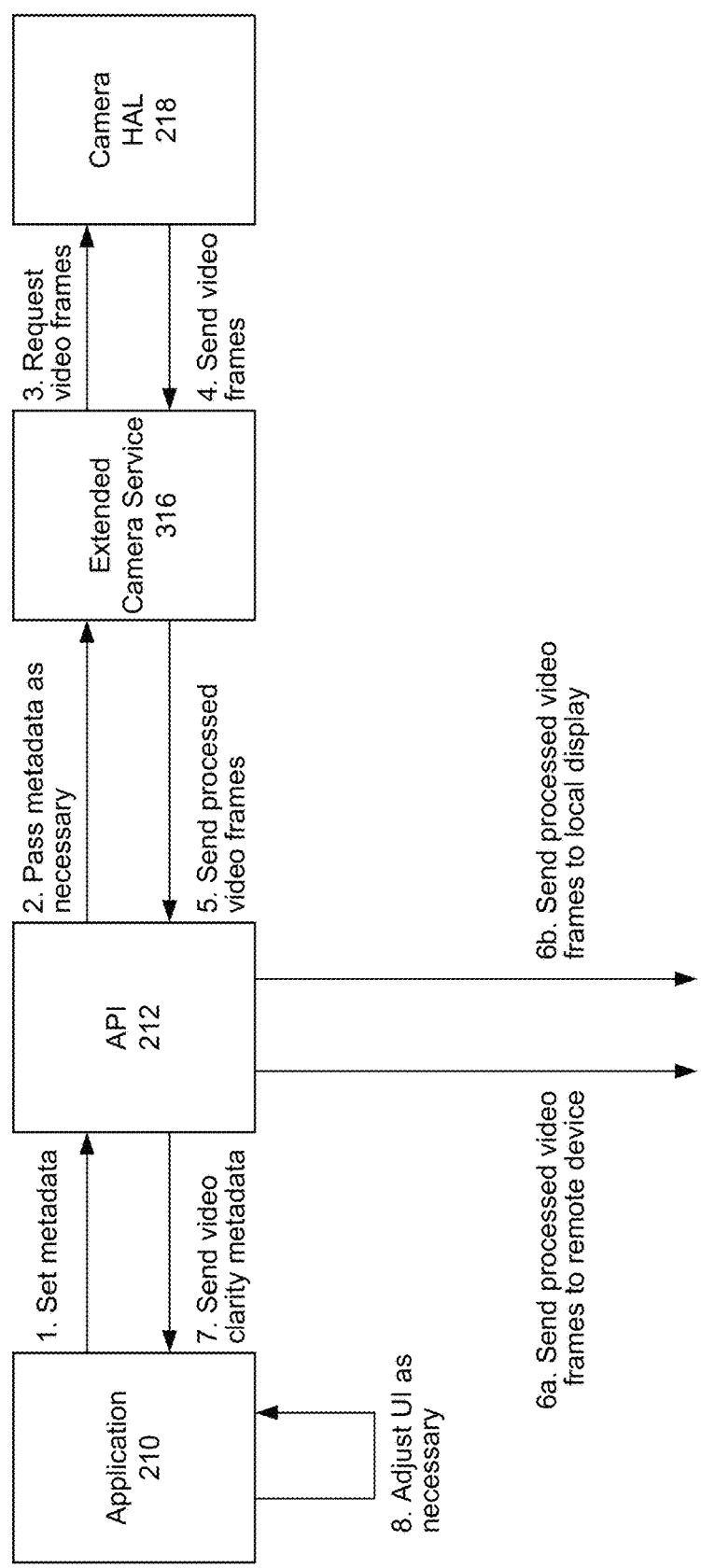

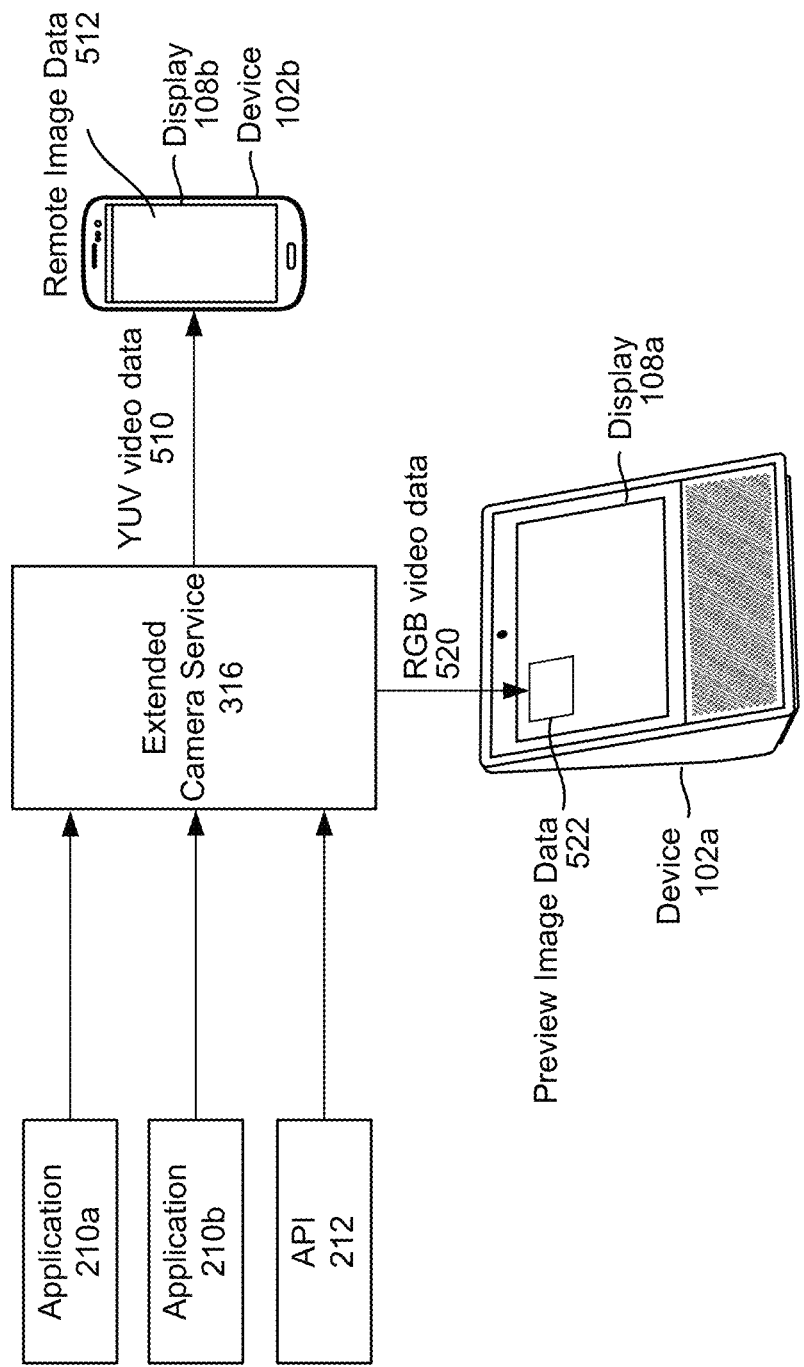

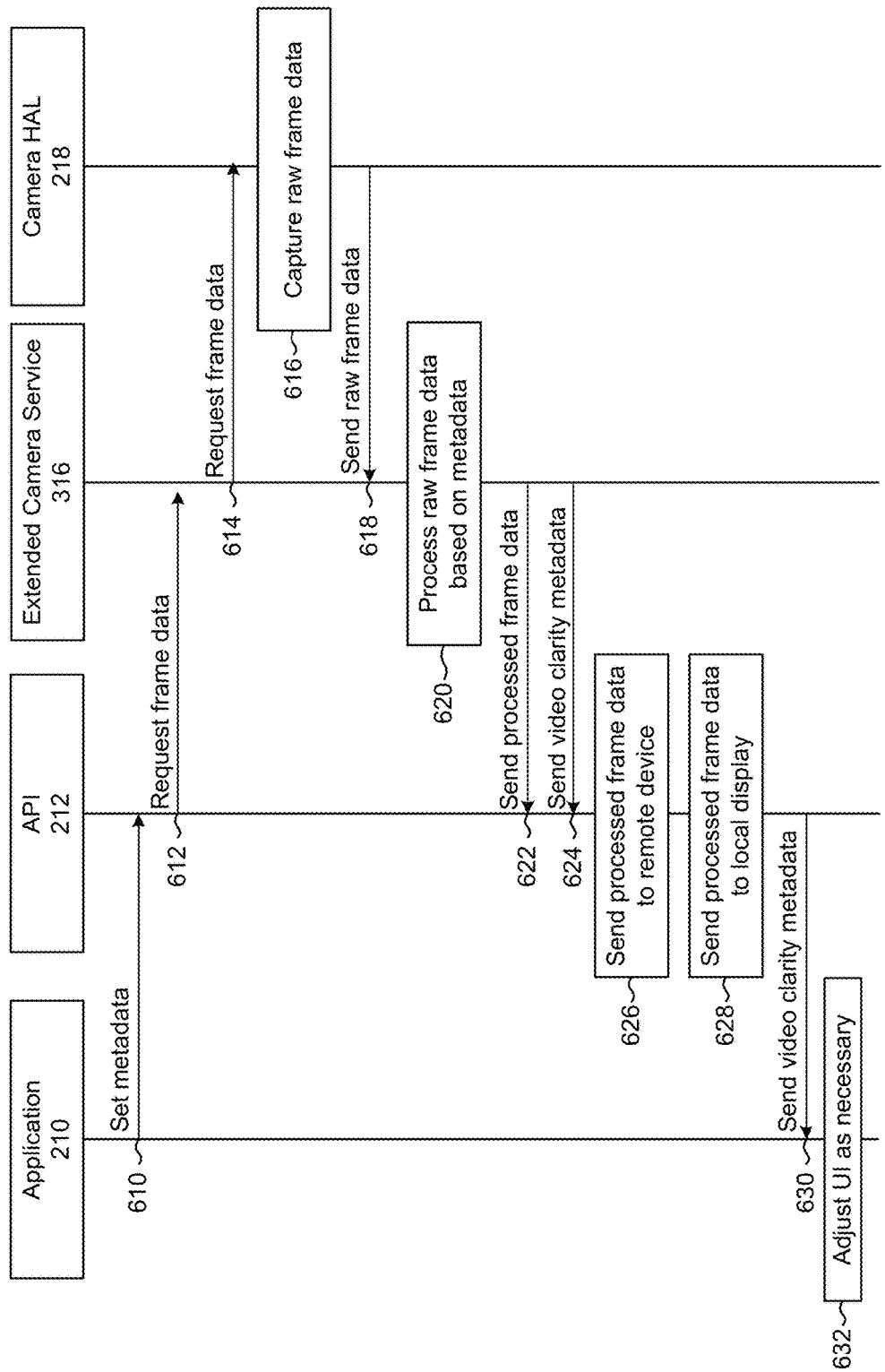

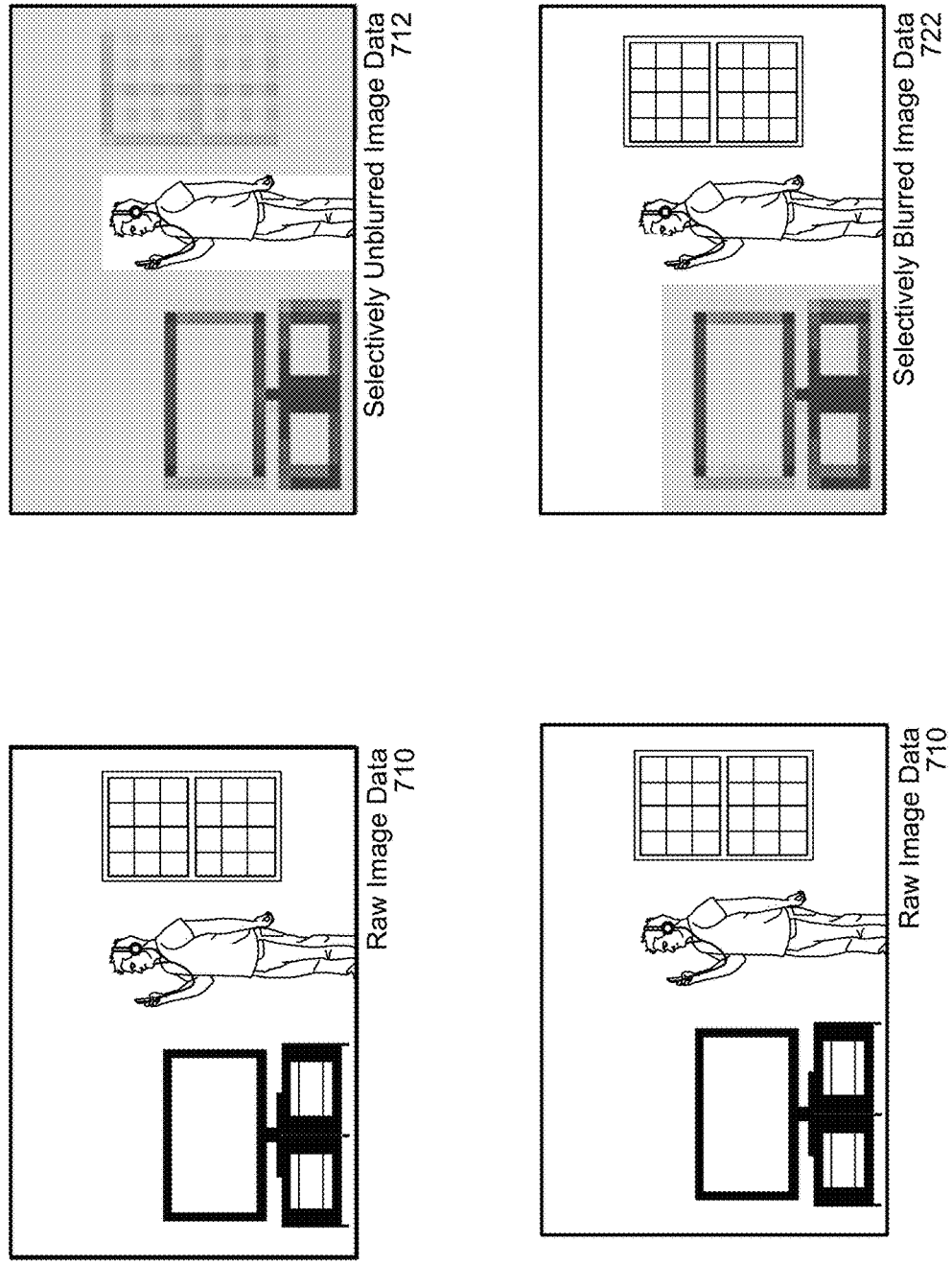

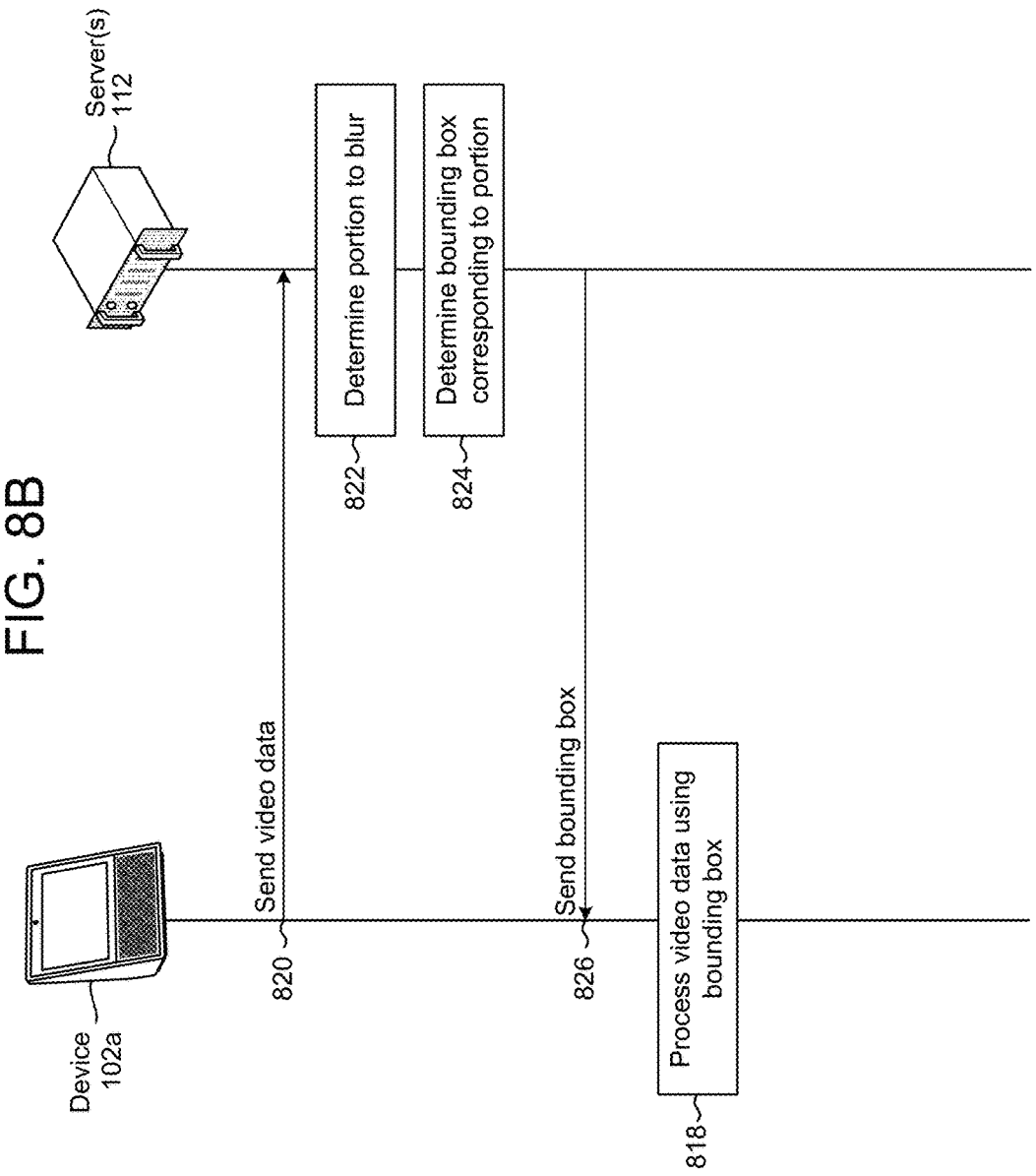

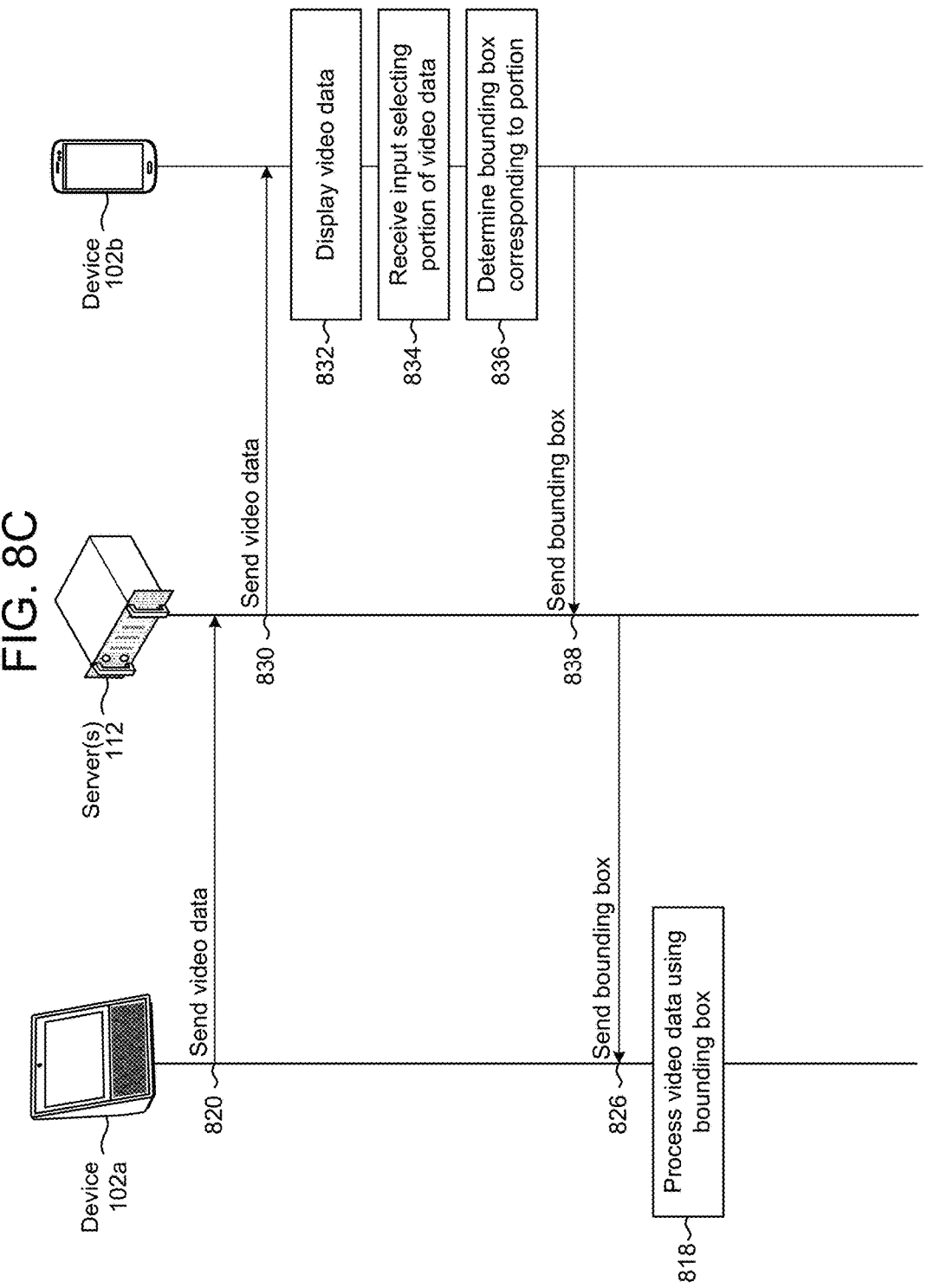

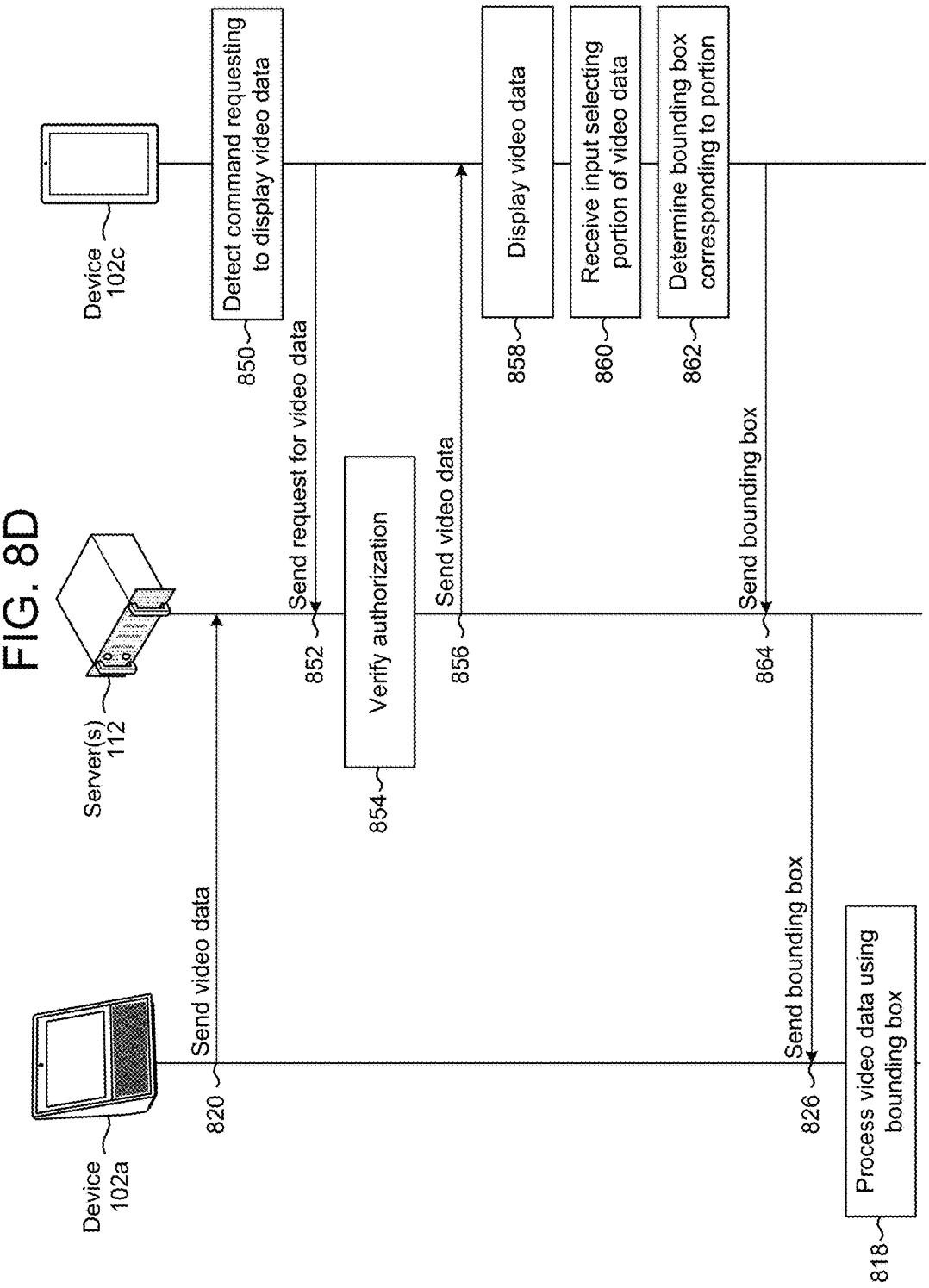

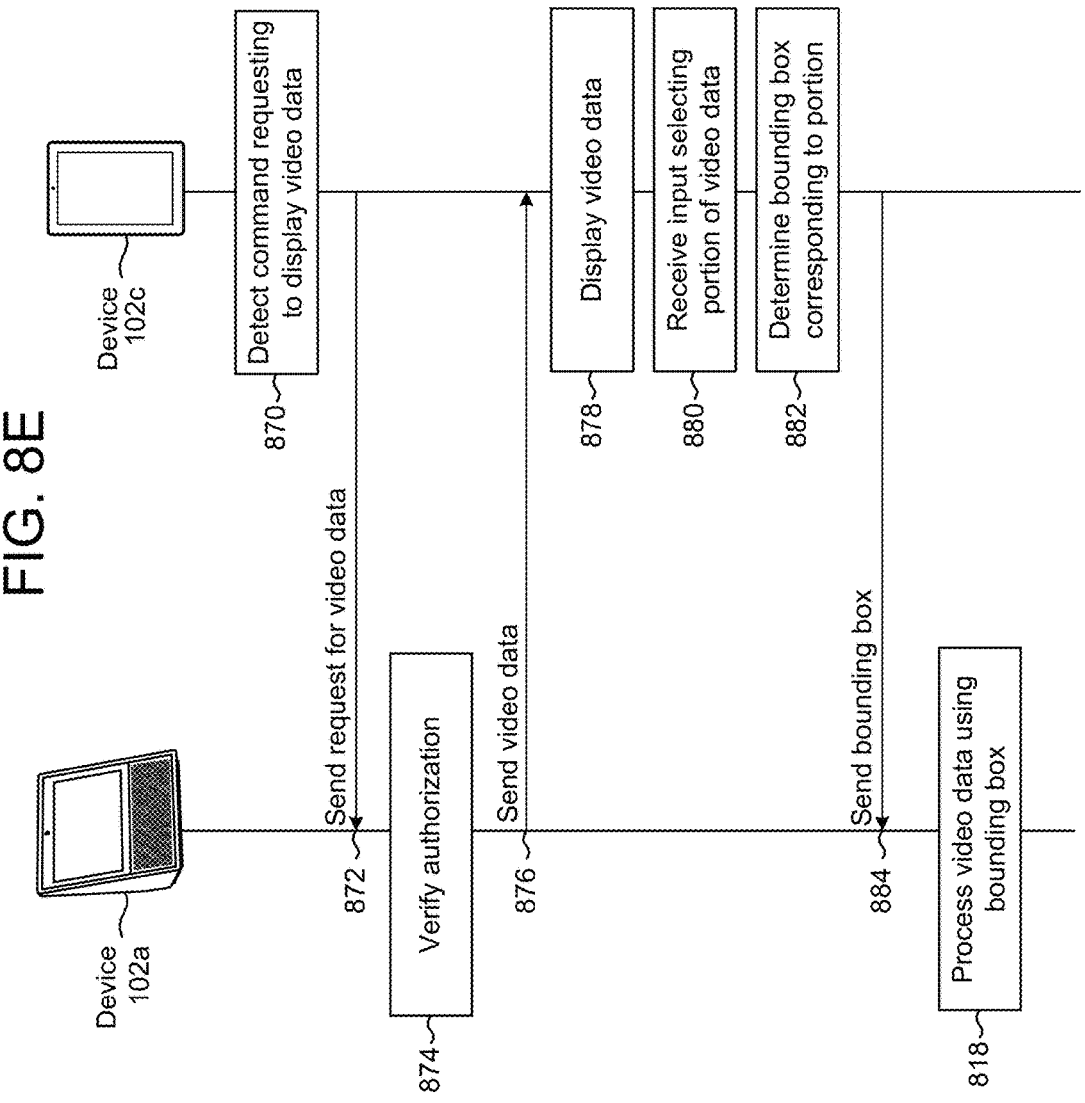

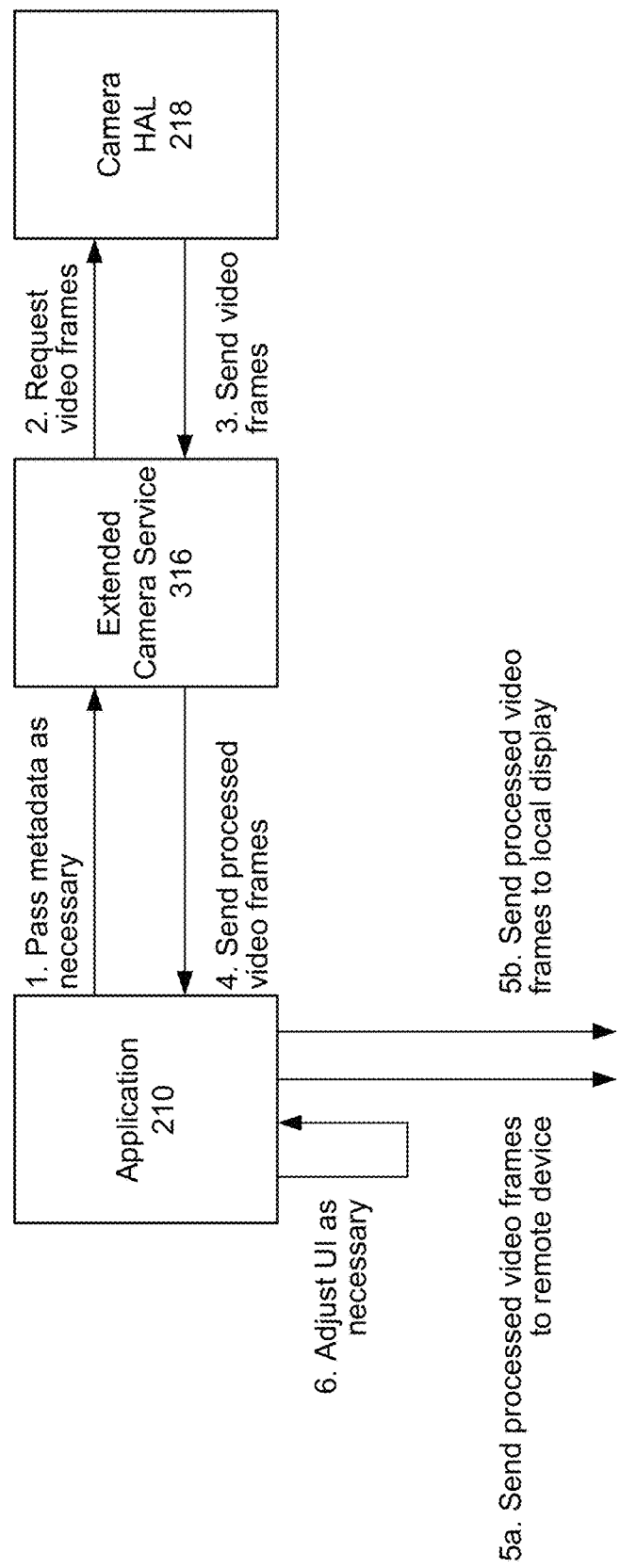

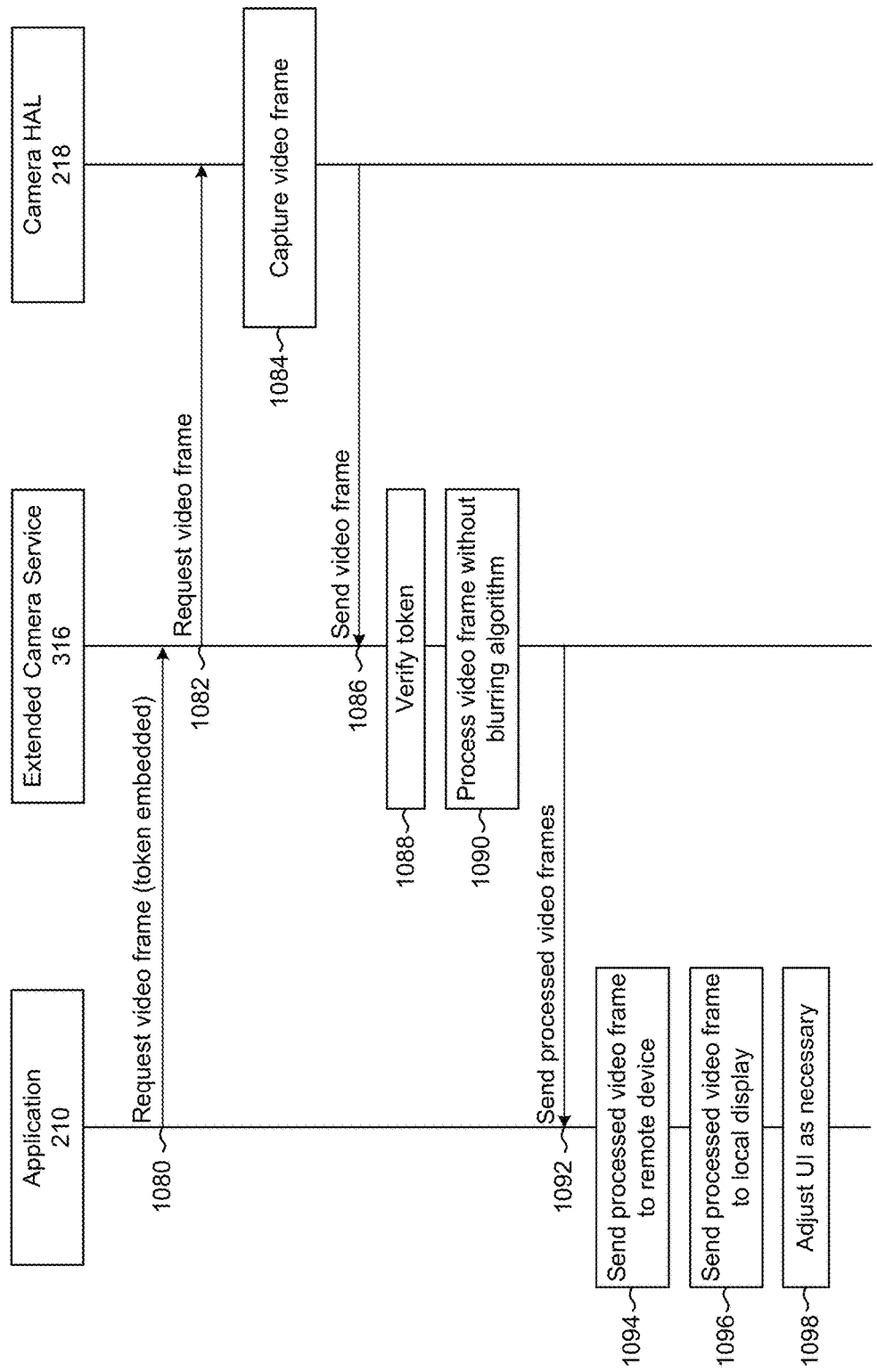

FIG. 11

| Device ID | IP Address | Name | Qualifier(1) | Qualifier(2) | ... | Qualifier(n) | Object |
|---|---|---|---|---|---|---|---|
| 444-xxx-332 | 194.66.82.11 | kitchen device | kitchen | --- | ... | --- | device |
| 557-xjv-432 | 192.65.82.31 | upstairs bedroom device | upstairs | bedroom | ... | --- | device |
| 408-jlj-879 | 192.67.28.43 | office lights | office | --- | ... | --- | lights |
| 136-sts-456 | 196.66.23.23 | living room television | living room | --- | ... | --- | television |

1104

User Profile Storage 1102

Network(s) 10

CAMERA-LEVEL IMAGE PROCESSING

BACKGROUND

With the advancement of technology, the use and popularity of electronic devices has increased considerably. Electronic devices are commonly used to transmit image data while videoconferencing.

BRIEF DESCRIPTION OF DRAWINGS

For a more complete understanding of the present disclosure, reference is now made to the following description taken in conjunction with the accompanying drawings.

FIG. 2A-2B illustrate examples of performing image processing at an application-level.

FIG. 3A-3B illustrate examples of performing image processing at a camera-level according to embodiments of the present disclosure.

FIG. 5 illustrates an example of performing image processing according to embodiments of the present disclosure.

FIG. 6 is a communication diagram that illustrates performing image processing at a camera-level according to embodiments of the present disclosure.

FIG. 7 illustrates examples of selectively unblurring and selectively blurring image data according to embodiments of the present disclosure.

FIGS. 8A-8E are communication diagrams that illustrate selectively blurring image data according to embodiments of the present disclosure.

FIG. 9 illustrates an example of performing image processing at a camera-level according to embodiments of the present disclosure.

FIGS. 10A-10C are communication diagrams that illustrate using a token to authorize generating image data without a blurring algorithm according to embodiments of the present disclosure.

FIG. 11 illustrates data stored and associated with user profiles according to embodiments of the present disclosure.

DETAILED DESCRIPTION

Electronic devices are commonly used to send video data between multiple devices while videoconferencing. For example, a first user of a local device may instruct the local device to capture and send video data to a remote device associated with a second user. Sometimes, the local device may be associated with the remote device such that the second user may establish a videoconference between the remote device and the local device without requiring the first user to authorize the local device to send video data. While it may be desirable for the users to automatically enable videoconferencing between the devices (such as between devices belonging to family members), these situations may result in a lack of privacy for the first user, as the second user may be able to view an environment around the local device without prior notice to the first user.

To protect a privacy of the first user, devices, systems and methods are disclosed that provide a privacy mode for a duration of time after an initial connection or in response to an instruction and/or inactivity during an ongoing videoconference. For example, while in the privacy mode the local device may apply a blurring process to blur video data prior to sending the video data to the remote device. Such a blurring process may give one user a "window" into the environment of another user while continuing to allow for some measure of privacy. For example, when the remote device first connects to the local device, the local device may enter the privacy mode and send blurred video data to the remote device for a short period of time (e.g., 10 seconds) and/or until receiving an instruction from a user of the local device to exit the privacy mode, enabling the second user to see the environment around the local device without sharpness or details. After the short period of time and/or upon receiving the instruction to exit the privacy mode, the local device may transition to sending unblurred video data without applying the blurring process. This enables the second user to quickly connect to the first user while protecting a privacy of the first user.

Figure 1:
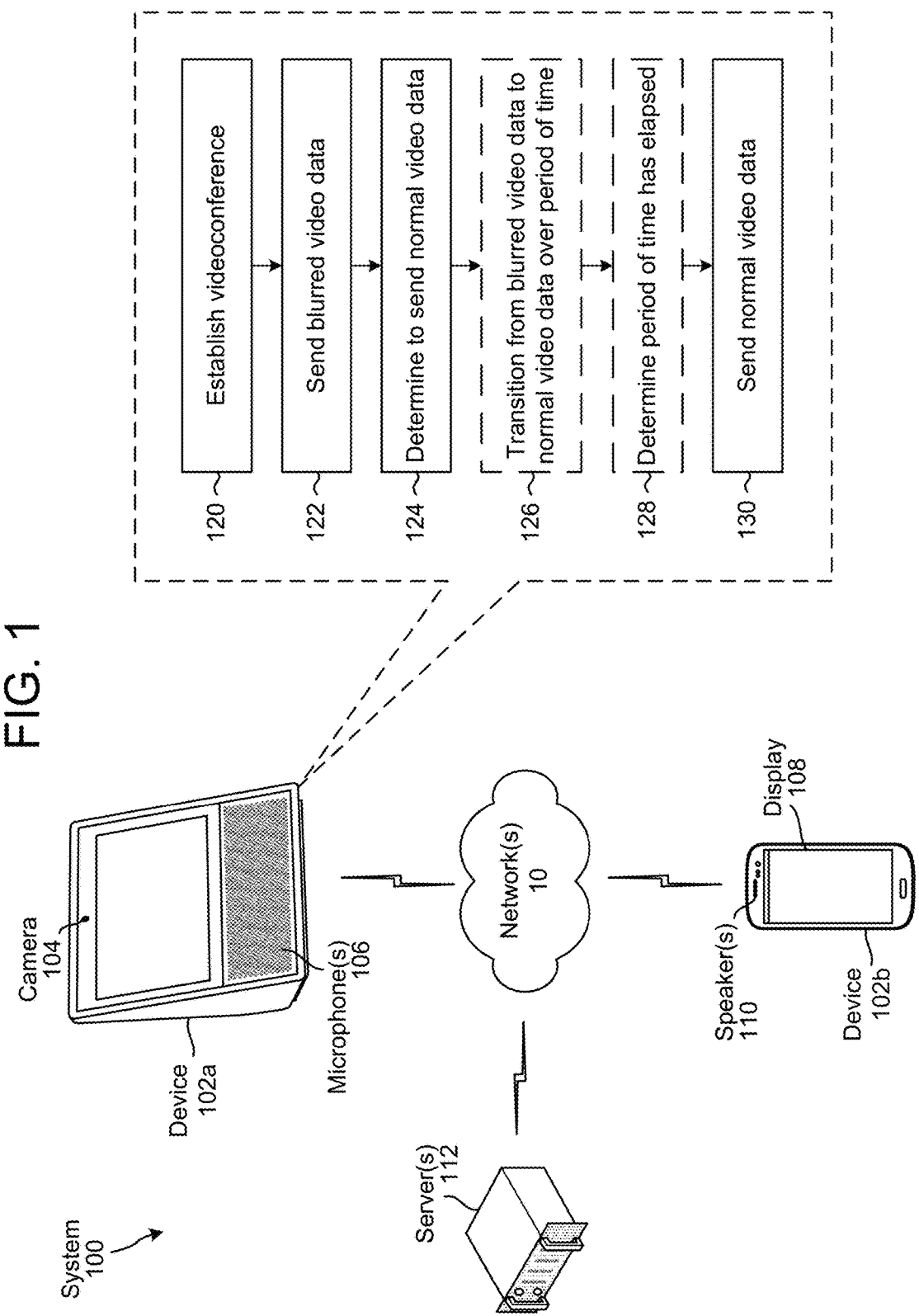
FIG. 1 illustrates a system for communicating between two devices according to embodiments of the present disclosure.

FIG. 1 illustrates an overview of a system 100 for implementing embodiments of the disclosure. The system 100 includes a first device 102a connected to a second device 102b via network(s) 10. The first device 102a and/or the second device 102b may be connected to server(s) 112 that may provide additional functionality and/or may offload processing from the devices 102a/102b. For example, the server(s) 112 may coordinate generating a communication link between the devices 102a/102b, may store user profiles associated with the devices 102a/102b, may perform image signal processing, image/video compression or other processing for the devices 102a/102b, may apply computer vision (CV) to identify people or objects of interest, or the like.

The first device 102a and the second device 102b may use the network(s) 10 to engage in a communication session (e.g., send and/or receive image data, video data, and/or audio data), which may be referred to as a videoconference. For example, the first device 102a may capture image data (e.g., individual images or video frames) using a camera 104, may generate video data (e.g., sequence of images) from the image data, may capture audio data using microphone(s) 106 and/or may stream the image data, the video data and/or the audio data to the second device 102b. The second device 102b may receive the image data, the video data and/or audio data, display image(s) and/or video(s) on a display 108 based on the image data and/or the video data and generate audio from the audio data using speaker(s) 110. Thus, a user of the second device 102b may see video of and/or hear audio from a first environment of the first device 102a when the first device 102a is in an active mode (e.g., sending unobscured video data).

In some examples, the videoconference may continue for an extended period of time and/or may be initiated by a second user of the second device 102b without requiring acceptance (e.g., acknowledgement) from a first user of the first device 102a. In order to protect a privacy of the first user, the first device 102a may enter a privacy mode and may generate video data that partially obscures the first environment. For example, the video data may be blurry (e.g., the first device 102a may apply a blurring process or blurring algorithm to a series of video frames to reduce a level of detail in the video frames) such that a presence of the first user in the first environment can be determined but an identity of the first user cannot be determined by the second user of the second device 102b from the video stream alone. As a first example, if the second user initiates the videoconference (e.g., the first device 102a receives a request to videoconference from the second device 102b) without acknowledgement from the first user (e.g., the first device 102a doesn't receive a command from the first user instructing the first device 102a to enter the active mode), the first device 102a may establish the videoconference in the privacy mode and may send obscured video data. In some examples, the first device 102a may remain in the privacy mode and send the obscured video data for a short period of time (e.g., ten seconds) before transitioning to the active mode. However, the disclosure is not limited thereto and the first device 102a may continue to send obscured video data until the first device 102a receives an acknowledgement from the first user to send unobscured video data without departing from the disclosure. As a second example, if the first user accepts the videoconference (e.g., inputs a command to the first device 102a instructing the first device 102a to enter the active mode and send unobscured video data) and then either inputs a first command to enter the privacy mode and/or leaves the first device 102a unattended for a duration of time, the first device 102a may send obscured video data until the first user inputs a second command to send the unobscured video again (e.g., enter the active mode).

As illustrated in FIG. 1, the first device 102a may establish (120) a videoconference and may send (122) blurred video data. For example, the first device 102a may receive user input from the first user instructing the first device 102a to initiate a videoconference with the second device 102b and/or may receive a request to videoconference from the second device 102b and may automatically initiate the videoconference. In some examples, the first device 102a may send blurred video data for a period of time (e.g., 10 seconds after a connection has been established). In other examples, the first device 102a may send blurred video data until the first devices 102a receives user input from the first user instructing the first device 102a to enter the active mode.

The first device 102a may apply the blurring algorithm using a Gaussian blur, a box blur, or the like and the blurring algorithm may include additional image signal processing techniques, such as adjusting and/or correcting a color, luminance, brightness, contrast, etc. of the video data. For example, the first device 102a may apply a color filter to reduce a color range of the blurred video data (e.g., fade to gray). The first device 102a may determine (124) to send normal video data. For example, the first device 102a may determine that the first period of time has elapsed and/or may receive an acknowledgement from the user or other instruction to enter the active mode. The first device 102a may optionally transition (126) from sending blurred video data to sending normal (e.g., unblurred video data) over a period of time (e.g., 2.5 seconds) and may optionally determine (128) that the period of time has elapsed. For example, the first device 102a may transition from the blurred video data to the unblurred video data, smoothly decreasing an amount of blur applied by a blurring algorithm. However, the disclosure is not limited thereto and steps 126-128 are illustrated using a dashed line to indicate that these steps are optional. Instead, the transition period may be minimal, such that the first device 102a instantly transitions from sending the blurred video data to sending the normal video data, without departing from the disclosure. The first device 102a may send (130) normal video data throughout the videoconference.

In some examples, the second device 102b may receive blurred image data at a first time and may display the blurred video data on the display 108 to a second user. After a duration of time (e.g., 10 seconds), the second device 102b may receive unblurred video data and may display the unblurred video data on the display 108. However, the disclosure is not limited thereto and the first device 102a may send the unblurred video data until it receives an instruction to exit the privacy mode without departing from the disclosure. In contrast to the unblurred video data, the blurred video data may have low image quality and may obscure details such that the presence of the first user and/or objects of interest in the first environment can be determined but identities of the first user and/or objects of interest cannot be determined by the second user. Thus, the blurred video data offers the first user privacy for a short period of time and/or until receiving an instruction to exit the privacy mode before transitioning to unblurred video data.

For example, the first device 102a may capture image data (e.g., individual images) using a camera 104, may generate blurred image data and/or blurred video data (e.g., sequence of images) from the image data by applying a blurring algorithm, may capture audio data using microphone(s) 106 and may stream the blurred image data, the blurred video data and/or the audio data to the second device 102b. The second device 102b may receive the blurred image data, the blurred video data and/or audio data, display image(s) and/or video(s) on a display 108 based on the blurred image data and/or the blurred video data and generate audio from the audio data using speaker(s) 110. Thus, a user of the second device 102b may see blurred images/video of and/or hear audio from a first environment of the first device 102a. After the short duration of time (e.g., 10 seconds), receiving an acknowledgement, and/or receiving an instruction from the user to enter the active mode, the first device 102a may stop generating the blurred image data and/or the blurred video data and may send unblurred image data and/or unblurred video data. The second device 102b may receive the unblurred image data, the unblurred video data and/or audio data, display image(s) and/or video(s) on a display 108 based on the unblurred image data and/or the unblurred video data and generate audio from the audio data using speaker(s) 110. Thus, a user of the second device 102b may see unblurred images/video of and/or hear audio from the first environment of the first device 102a.

As used herein, "video data" may refer to any visual content, such as video data and/or image data. For example, video data may refer to a series of video frames captured over a period of time, a sequence of images captured at a single time, sequence(s) of images captured periodically, a single image or the like. Thus, the video data includes any visual content captured at any frequency that is sent as part of visual content communication. For ease of explanation, video data may be referred to as including video frames, although the disclosure is not limited thereto. Instead, video data may include frame data, with a video frame being one example of different types of frame data and/or only a portion of the frame data.

As used herein, an active mode refers to capturing and sending video data that is unblurred (e.g., normal video data corresponding to unobscured video), whereas a privacy mode refers to blurring the video data and sending the blurred video data corresponding to obscured video.

In some examples, the device 102 may require acknowledgment to enter the active mode. For example, the first device 102a may receive a request to videoconference from the second device 102b and, prior to entering the active mode, the first device 102a may require an acknowledgement command from a first user of the first device 102a that instructs the first device 102a to accept the videoconference request and enter the active mode. The acknowledgement may be explicit (e.g., user presses a button, issues a voice command or the like), implicit (e.g., user looks at the camera, two or more users are represented in the video data, or the like) and/or automatic (e.g., motion is detected, audio is detected or the like) based on user preferences. The acknowledgement may vary based on the user preferences, which may allow implicit and/or automatic authorization only at certain times of the day, or between certain users and/or devices, or the like. In some examples, acknowledgement of the videoconference may be triggered by receipt of user input. The user input may include, for example, voice input (e.g., speech corresponding to voice commands), physical input (e.g., button press, keyboard, mouse, touchscreen, etc.) received at the device 102, gestures (e.g., hand motions, facial expressions, etc.), actions (e.g., looking at a camera 104 of the device 102), conditions (e.g., two or more people represented in the video data) or the like. The user input may accept the videoconference request and trigger the device 102 to enter the active mode and send unobscured video data.

FIG. 1 illustrates an example of sending visual content (e.g., video data) from a first device 102a to a second device 102b as part of a videoconference (e.g., real-time communication session that includes visual content). In some examples, a videoconference may refer to bidirectional content (e.g., the first device 102a sends first video data to the second device 102b and the second device 102b sends second video data to the first device 102a), although the disclosure is not limited thereto. Instead, as used herein, a videoconference may refer to any real-time visual content communication that includes visual content (e.g., image data and/or video data) sent from at least a first device to at least a second device. Examples of visual content communication include unidirectional (e.g., content sent from first device 102a to second device 102b but not from second device 102b to first device 102a), such as a security camera or remote capture device; bidirectional unicast (e.g., first content sent from first device 102a to second device 102b and second content sent from second device 102b to first device 102a), such as a video conference, video chat or video messaging between two devices; bidirectional multicast (e.g., first content sent from first device 102a to second device 102b and third device 102c, second content sent from second device 102b to first device 102a and third device 102c, third content sent from third device 102c to first device 102a and second device 102b, etc.), such as a video conference, video chat or video messaging between three or more devices; unidirectional multicast (e.g., first content sent from first device 102a to second device 102b and third device 102c, but the first device 102a does not receive content from the second device 102b or the third device 102c), such as video streaming or the like; any other variation of visual content communication, or any combinations thereof. For example, during a group communication the third device 102c may not send content to the first device 102a and the second device 102b, but may receive content from the first device 102a and the second device 102b.

As discussed above, the server(s) 112 may provide additional functionality to the devices 102a/102b and/or may offload processing from the devices 102a/102b. As a first example, the server(s) 112 may coordinate generating a communication link between the devices 102a/102b. Thus, the server(s) 112 may receive a command and interpret the command to identify the devices 102a/102b and establish the videoconference. As a second example, the server(s) 112 may store user profiles associated with the devices 102a/102b. Thus, the server(s) 112 may store data corresponding to an account, individual users, devices 102 associated with the individual users, associations between individual users, associations between individual devices 102, address information corresponding to individual devices 102, or the like. As a third example, the server(s) 112 may perform image signal processing, image/video compression or other processing for the devices 102a/102b. Thus, the server(s) 112 may receive image data and/or video data from the devices 102a/102b and may process the image data/video data and send the processed image data/processed video data to the devices 102a/102b (e.g., the source device that sent the image data/video data or a destination device). As a fourth example, the server(s) 112 may apply computer vision (CV) to image data/video data received from the devices 102a/102b in order to identify people or objects of interest. Thus, the devices 102a/102b may send image data/video data to the server(s) 112 and the server(s) 112 may identify whether a human is present, pixels associated with the human, an identity of the human, object(s) of interest, pixels associated with the object(s) of interest, whether motion is present in the video data or the like. As a fifth example, the server(s) 112 may receive audio data and/or video data from the devices 102a/102b and may perform speech processing to interpret commands included in the audio data. Thus, a user of the first device 102a may speak an utterance, the first device 102a may capture audio data corresponding to the utterance and send the audio data to the server(s) 112 and the server(s) 112 may perform automatic speech recognition (ASR) and interpret the utterance to generate a command.

While FIG. 1 illustrates the camera 104 as internal to the first device 102a, the present disclosure is not limited thereto and the camera 104 may be external to the first device 102a without departing from the disclosure. Similarly, while FIG. 1 illustrates the second device 102b having an internal display 108, the present disclosure is not limited thereto and the display 108 may be external to the second device 102b. Additionally or alternatively, while FIG. 1 illustrates the first device 102a and the second device 102b being stationary devices (e.g., devices that are intended to remain stationary), the disclosure is not limited thereto and the first device 102a and/or the second device 102b may be mobile devices (e.g., tablet computer, smartphone, or the like), or any device capable of capturing video data and/or displaying video data. Examples of devices 102 may include mobile devices (e.g., tablet computer, smartphone, electronic reader, or the like), computer devices (e.g., laptop computer, desktop computer or the like), media devices (e.g., television, headless device connected to a television, video game console, or the like), speech controlled devices (e.g., devices whose primary input/output is through audio), although the disclosure is not limited thereto. While FIG. 1 illustrates the first device 102a and the second device 102b being different, the disclosure is not limited thereto and the first device 102a may be identical to the second device 102b.

In some examples, the videoconference may include video data and/or audio data sent in only one direction. For example, the second device 102b may not include a camera 104 and/or microphone(s) 106, the first device 102a may not include a display 108 and/or speaker(s) 110, and/or a user of the second device 102*b* may not want to send video data or audio data to the first device 102*a*. Examples of unidirectional videoconferencing include a first user of the first device 102*a* wanting to show something to a second user of the second device 102*b* (e.g., friends and family sharing audio and/or video), a second user of the second device 102*b* monitoring a first user of the first device 102*a* (e.g., a parent supervising a child), and/or a baby camera, security camera or other device enabling a user of the second device 102*b* to see a remote location (e.g., a single user controlling the first device 102*a* and the second device 102*b*).

In some examples, the videoconference may include video data and/or audio data sent in both directions. For example, the second device 102*b* may include a second camera 104 and/or second microphone(s) 106 and the first device 102*a* may include a second display 108 and/or second speaker(s) 110. The second device 102*b* may capture video data using the second camera 104 and/or audio data using the second microphone(s) 106 and may send the video data and/or audio data to the first device 102*a*. The first device 102*a* may receive the video data and/or audio data and display the video data on the second display 108 and/or generate audio from the audio data using the second speaker(s) 110. Thus, a user of the first device 102*a* may see video of and/or hear audio from a second environment of the second device 102*b*. An example of bidirectional videoconferencing is a first user of the first device 102*a* communicating with a second user of the second device 102*b* (e.g., conversation between friends and family), although bidirectional videoconferencing may allow the first user and/or the second user to view video data when the other user is not present (e.g., second user may view video from a first location of the first device 102*a* when the first user is not present).

While FIG. 1 illustrates only two devices 102*a*/102*b*, the disclosure is not limited thereto and the videoconference may include video data and/or audio data sent from multiple devices (e.g., multi-directional videoconferencing) without departing from the disclosure. For example, three or more family members may videoconference together.

A videoconference may be similar to a phone call to enable friend and family to keep in touch, or a user may establish a videoconference for a duration of time to monitor the remote location, such as a pet owner checking on their pets while at work or a homeowner checking on their home (e.g., residence, vacation home or the like) while away. When the first device 102*a* and the second device 102*b* are associated with a single user, the user may establish a videoconference by sending a request from a local device (e.g., second device 102*b*) to a remote device (e.g., first device 102*a*) and the remote device may capture and send video data. When the first device 102*a* and the second device 102*b* are associated with different users, a video conference may be established when a first user sends a request to videoconference to the second user and the second user accepts the request (e.g., acknowledgment), whether by explicit instruction or based on a preexisting relationship.

In some examples, a videoconference may be a continuous event. For example, a videoconference may be established and the first device 102*a* and/or the second device 102*b* may continuously stream video data and/or audio data for an extended period of time (e.g., hours, days, etc.), regardless of whether a user is present at either device 102*a*/102*b*. Additionally or alternatively, the first device 102*a* and the second device 102*b* may be associated such that either device 102*a*/102*b* may initiate a videoconference without requiring acknowledgment (e.g., acceptance of the videoconference by a user of the other device 102*a*/102*b*). Thus, the videoconference may continue for an extended period of time and/or start and stop without acknowledgement from a user of the devices 102*a*/102*b*. Examples may include a videoconferencing room between two locations (e.g., a first conference room in a first office location and a second conference room in a second office location), videoconferencing between close family and friends (e.g., husband/wife, parent/child, siblings and/or close friends may establish an ongoing videoconference between two devices 102), remote monitoring (e.g., pet owner monitoring their pets, homeowner monitoring their home, etc.) or the like.

The first device 102*a* and the second device 102*b* may be associated directly (e.g., a specific device is explicitly given permission to videoconference with a specific device), based on a user (e.g., a first user is associated with a second user), based on an account (e.g., the first device 102*a* and the second device 102*b* are associated with a single account) or the like. For example, close friends and family may provide permission to each other to initiate a videoconference without requiring acknowledgement in order to facilitate communication. While permission to initiate a videoconference without requiring acknowledgement may be granted, the user may not want to send unobscured video data without their knowledge. Therefore, a device may generate video data that partially obscures the environment for a period of time. For example, the video data may be blurry (e.g., include a series of video frames that are blurred using image signal processing techniques) such that a presence of the user in the environment can be determined but an identity of the user cannot be determined. Thus, if a second user initiates the videoconference and the user does not explicitly grant permission to send the unobscured video data, the first device 102*a* may establish the videoconference but send the obscured video data for a short period of time and/or until the user explicitly grants permission to send the unobscured video data.

Typically, an application may request image data from a camera device (e.g., camera chip, image sensor or the like) and may receive image data from the camera device. For example, the application may send a request for video frame(s) (e.g., request for frame data) to the camera device and the camera device may capture image data and may send the image data to the application. After receiving unblurred image data, the application may enter a privacy mode by applying a blurring algorithm to blur the image data and sending the blurred image data to a remote device (e.g., second device 102*b*). The application receives the unblurred image data directly from the camera, however, and any image processing or blurring algorithms are applied to the image data by the application.

Figure 2B:
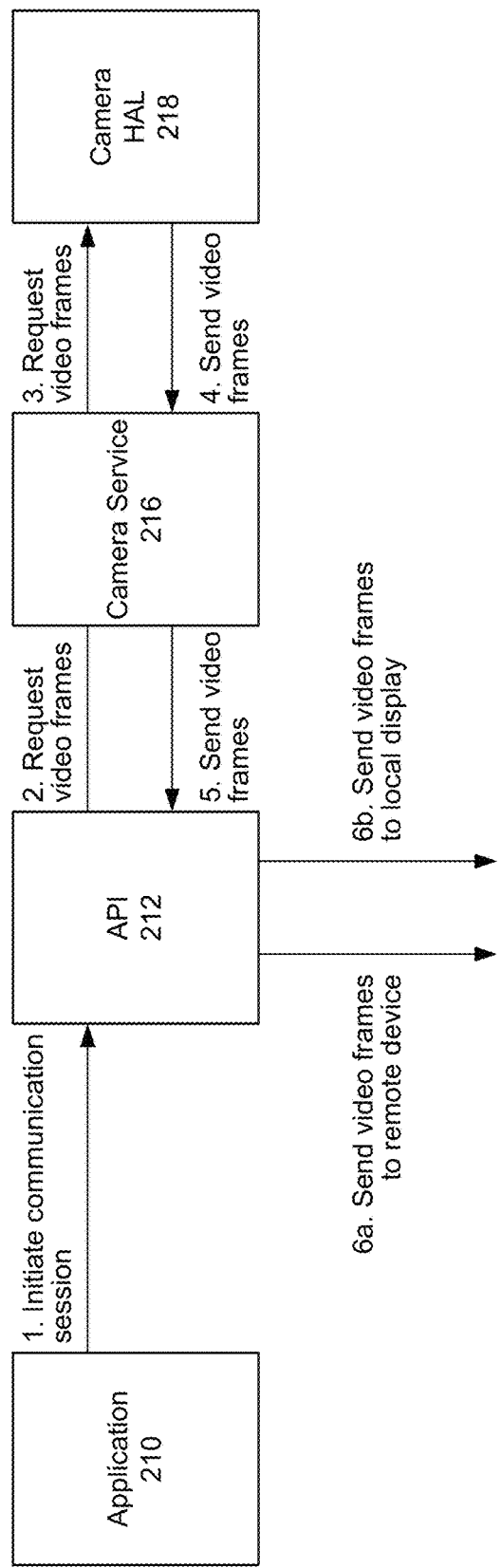

FIG. 2A-2B illustrate examples of performing image processing at an application-level. For example, FIG. 2A is an example of layer structures used to communicate between an application and hardware on a device. As illustrated in FIG. 2A, an application 210 may communicate with specific hardware (e.g., camera 104) via multiple different layers, such as an application programming interface (API) 212, a transaction layer 214, a camera service 216, a camera hardware abstraction layer (HAL) 218, a link layer 220 and a physical layer 222. As used herein, the application 210 may be any application (e.g., software on the first device 102*a*) used to engage in a communication session with a remote device (e.g., second device 102*b*). For example, the first device 102*a* may include first software 210*a* and the second device 102*b* may include second software 210*b*.

Typically, the application 210 may closely interact with the transaction layer 214 and the link layer 220. In order to facilitate coding of the application 210, the API 212 may be used to enable the application 210 to interact with different hardware without specific programming. For example, the API may generate API calls, including routines for basic asynchronous transactions (read, write, and lock), setup of isochronous transfers, inquiry of information on the status of the local node, or the like. Thus, the API 212 may generate requests and/or responses to incoming requests without explicit programming in the application 210, enabling the application 210 to communicate with various hardware without being specifically programmed to communicate with the hardware.

The hardware (e.g., camera 104) may be associated with the link layer 220 and/or the physical layer 222. However, the API 212 and the transaction layer 214 may be independent from a link layer controller associated with the camera 104 in order to be usable for different embedded systems (e.g., different hardware without needing to be reprogrammed). Therefore, the camera 104 may include camera HAL 218, which may be used to transform services requested to the link layer 220 into corresponding hardware accesses. The camera HAL 218 may be a set of routines in software that emulate some platform-specific details, giving the application 210 and/or the API 212 direct access to hardware resources (e.g., capturing image data). This may allow the application 210 to be device-independent and use standard operating system calls to hardware.

As illustrated in FIG. 2A, the first device 102a may include the camera service 216, which may be software (e.g., programming code) running on top of the camera HAL 218, and therefore the API 212 may interact with the camera service 216 instead of interacting directly with the camera HAL 218. For example, the API 212 may send a request for image data to the camera service 216 and the camera service 216 may send a request for image data to the camera HAL 218, receive raw image data from the camera HAL 218 and process the raw image data to generate processed image data before sending the processed image data to the API 212.

Thus, the API 212, the camera service 216 and the camera HAL 218 may act as intermediary layers between the application 210 and the link layer 220 associated with the camera 104. For example, the application 210 may communicate with the camera 104 (e.g., link layer 220) via the API 212, the transaction layer 214, the camera service 216 and/or the camera HAL 218. If the application 210 requests image data from the camera 104, the application 210 may send a request for video frame(s) to the API 212, which may relay the request to the camera service 216, which may instruct the camera 104 to capture image data. The camera service 216 may then send the image data generated by the camera 104 to the API 212 directly and/or via the transaction layer 214, and the API 212 may send the image data to the application 210.

As illustrated in FIG. 2A, the camera service 216 may send isochronous data to the API 212 directly, whereas the camera service 216 may send asynchronous data to the API 212 via the transaction layer 214. Asynchronous data may correspond to data that can be transferred at variable data rates, such as the request for video frames and/or other command data. The asynchronous data may include a start bit to signal a beginning of a data transmission, a stop bit to signal an end of the data transmission, and may include an error detection mechanism such that if an error is detected, the data can be resent. In contrast, isochronous data may send blocks of data asynchronously (e.g., at random intervals), may correspond to a fixed data rate, and may not include an error detection mechanism (acknowledgment of receipt of packet) because if an error were detected, time constraints would make it impossible to resend the data. Thus, the isochronous data may correspond to streaming video (e.g., image data sent during a communication session).

In some examples, the application 210 may send image data during a communication session (e.g., video conference) with the second device 102b using the API 212 such that the API 212 sends the image data to the second device 102b. Thus, instead of the application 210 receiving the image data from the camera service 216, the API 212 receives the unblurred image data from the camera service 216 and sends the unblurred image data to the second device 102b and to a local display (e.g., display 108) connected to the first device 102a. As illustrated in FIG. 2B, the application 210 may initiate the communication session, which instructs the API 212 to request video frames from the camera service 216, which requests the video frames from the camera HAL 218. The camera HAL 218 may capture video frames (e.g., image data) and may send the video frames to the camera service 216, which sends the video frames to the API 212. The API 212 may send the video frames (e.g., unblurred image data) to the remote device (e.g., second device 102b) and to the local display (e.g., display 108 on the first device 102a) directly, without sending the video frames to the application 210.

In some examples, the API 212 may correspond to web real-time communication (WebRTC), which is a collection of communication protocols and application programming interfaces that enable real-time communication over peer-to-peer connections, although the disclosure is not limited thereto. WebRTC may allow the applications 210 to request resources and/or real-time information from backend servers and/or other devices, enabling video conferencing, file transferring or the like without the need of internal or external plugins. Thus, the first application 210a on the first device 102a may use WebRTC to send and/or receive image data during a communication session with the second application 210b on the second device 102b. For example, the API 212 (e.g., WebRTC) may communicate with the camera 104 and may receive video frames from the camera 104 to send to the second device 102b and/or to the display 108 on the first device 102a directly.

During the privacy mode, the second application 210b on the second device 102b may apply the blurring algorithm to blur the image data prior to displaying the image data on a display 108 of the second device 102b. However, the implementation illustrated in FIG. 2B results in several issues. First, the first application 210a on the first device 102a does not receive the image data captured by the camera 104 and therefore does not apply the blurring algorithm to the image data prior to the image data being sent to the display 108 on the first device 102a. Instead, the API 212 sends the unblurred image data to the display 108, such that a first user of the first device 102a does not see the blurred image data that is displayed by the second device 102b. Second, as the API 212 sends the unblurred image data to the second device 102b, there is a security risk that the unblurred image data may be intercepted prior to being blurred by the second application 210b.

To improve a privacy mode by displaying the same blurred image data on the first device 102a that is displayed on the second device 102b, as well as to reduce the security risk of sending the unblurred image data, the first device 102a may perform image processing at the camera-level instead of at the application-level. For example, the first device 102a may include an extended camera service 316 that performs additional or "extended" image processing prior to sending image data to the API 212. For example, the extended camera service 316 may apply a blurring process to generate blurred image data prior to sending the blurred image data to the API 212.

Figure 3A:
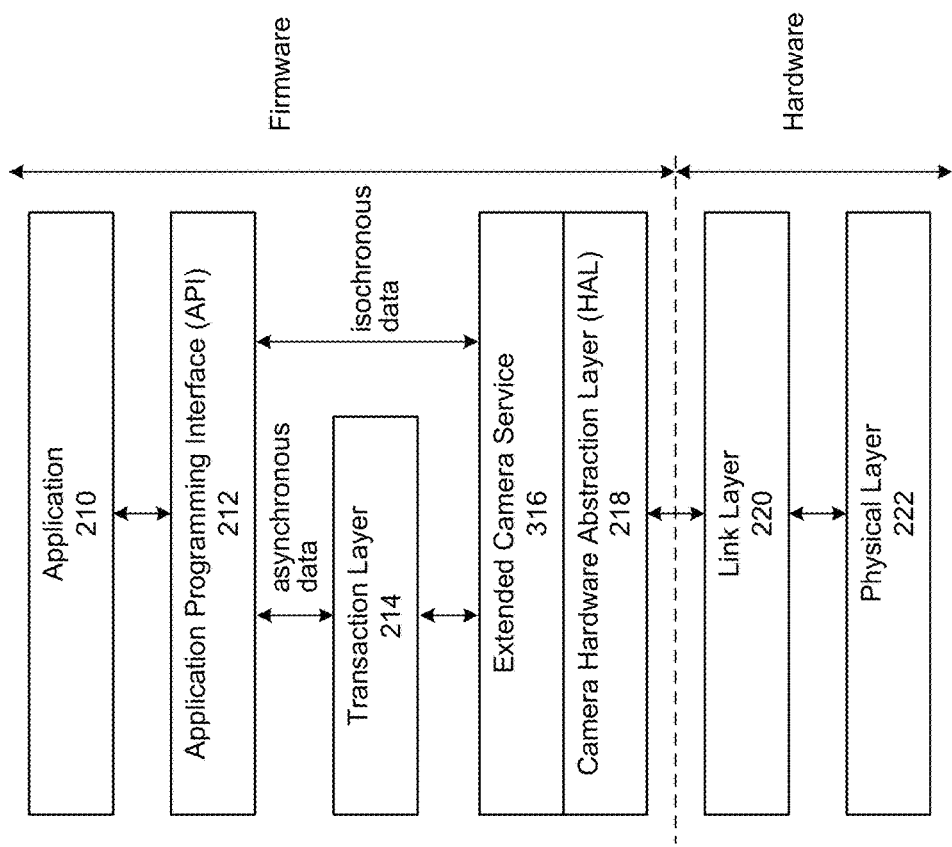

FIG. 3A-3B illustrate examples of performing image processing at a camera-level according to embodiments of the present disclosure. As illustrated in FIG. 3A, the first device 102a may include the extended camera service 316, which may be software (e.g., programming code) running on top of the camera HAL 218, and therefore the API 212 may interact with the extended camera service 316 instead of interacting directly with the camera HAL 218. For example, the API 212 may send a request for image data to the extended camera service 316 and the extended camera service 316 may send a request for image data to the camera HAL 218, receive raw image data from the camera HAL 218 and process the raw image data to generate processed image data before sending the processed image data to the API 212. The extended camera service 316 may provide the same functionality (e.g., image processing) as discussed above with regard to the camera service 216, along with additional functionality such as performing extended image processing that is not performed by the camera service 216. For example, the extended camera service 316 may apply a blurring process to generate blurred video data. Thus, the extended camera service 316 may implement extended image processing on the camera-level, instead of the application-level, such that any application 210 and/or API 212 requesting image data will receive the processed image data from the extended camera service 316.

The extended camera service 316 may perform a number of functions, such as sending instructions and/or requests to the camera HAL 218 (e.g., instructing the camera 104 to start/stop capturing image data), receiving raw image data from the camera HAL 218, translating the raw image data to different color spaces (e.g., a first color space, such as a YUV color space corresponding to luma values and chrominance values, a second color space, such as an RGB color space corresponding to red values, green values and blue values, or the like), applying different image processing algorithms and/or generating processed image data to send to a consumer of the image data (e.g., the application 210, the API 212, or the like).

By including the extended camera service 316, the device 102 may be configured to perform multiple different types of image processing at the camera-level. For example, the extended camera service 316 may apply a blurring algorithm, a color filter, different video effects, one or more augmented reality filters, and/or the like. While the following examples describes the extended camera service 316 applying a blurring algorithm and a color filter in detail, the disclosure is not limited thereto and the extended camera service 316 may apply any image processing or video effects to generate processed image data without departing from the disclosure.

To instruct the extended camera service 316 to perform specific image processing, the application 210 may instruct the API 212 to include parameters associated with the image processing in a request for a video frame (e.g., capture request, frame request, or the like). For example, the application 210 may set metadata corresponding to the parameters and the API 212 may include the metadata in at least one request for a video frame. The extended camera service 316 may receive the request for the video frame, including the metadata, may determine the image processing to be performed and parameters associated with the image processing, and may generate the processed image data using the specific image processing instructed by the application 210. This operation is transparent to the API 212, with the API 212 including the metadata (e.g., parameters specifying specific image processing) in at least one request for a video frame and the extended camera service 316 determining the image processing parameters using the metadata.

In some examples, the API 212 may initially include metadata when the application 210 sets or changes the metadata, omitting the metadata in subsequent capture requests. For example, the API 212 may pass first metadata with a single capture request and the extended camera service 316 may apply the first metadata for multiple video frames until the API 212 passes second metadata with a later capture request. Thus, the metadata is only sent from the API 212 to the extended camera service 316 as it is changed by the application 210. However, the disclosure is not limited thereto and the API 212 may send the first metadata with multiple capture requests and/or frame requests without departing from the disclosure. For example, the API 212 may send the first metadata with each frame request without departing from the disclosure.

By including the extended camera service 316 in the device 102, the application 210 may send special commands to the extended camera service 316 to enable special image processing that is not typically performed at the camera-level. For example, the extended camera service 316 is not typically included between the API 212 and the camera HAL 218, and the special commands that are passed from the application 210 to the extended camera service 316 are not typically included in a frame request from the API 212 to the camera HAL 218.

FIG. 3B illustrates an example of performing image processing on the camera-level during a communication session (e.g., videoconference). As illustrated in FIG. 3B, the application 210 may initiate the communication session and set metadata for the API 212, which instructs the API 212 to request video frames (e.g., request frame data) from the camera HAL 218. As the extended camera service 316 is running on top of the camera HAL 218, the API 212 may pass the metadata as necessary to the extended camera service 316.

The metadata may indicate various parameters associated with the capture/frame request, such as a height, width, color space, etc. As the extended camera service 316 provides additional functionality, the metadata may include additional parameters to instruct the extended camera service 316 to perform additional image processing corresponding to the additional functionality. For example, the metadata may specify that the extended camera service 316 apply a blurring algorithm or the like to generate the blurred video data, along with additional parameters associated with the blurring algorithm (e.g., width and strength of blurring algorithm, type of blurring algorithm, transition time, transition type, etc.).

The extended camera service 316 may request video frames from the camera HAL 318 and the camera HAL 318 may capture raw video frames (e.g., raw image data corresponding to an unblurred image) and send the raw video frames to the extended camera service 316.

The extended camera service 316 may determine the parameters for image processing indicated by the metadata and may apply the image processing to the raw video frames to generate processed video frames (e.g., processed image data corresponding to a blurred image), which it sends to the API 212. The API 212 may send the processed video frames to the remote device (e.g., second device 102b) and to a local display (e.g., display 108 on the first device 102a). Thus, the first device 102a may display to the first user the same blurred image that is displayed on the second device 102b. In addition, the API 212 may also send video clarity metadata (e.g., callback information) to the application 210, which enables the application 210 to adjust the user interface (UI) as necessary. For example, the video clarity metadata may indicate whether the video frames are blurred or unblurred, and the application 210 may indicate whether the video frames are blurred or unblurred using a visual indicator or the like.

In some examples, the image processing may include a blurring algorithm to generate processed image data that is blurred relative to the raw image data. For example, the extended camera service 316 may apply any blurring algorithm known to one of skill in the art, such as a box blur, a Gaussian blur or the like, without departing from the disclosure. The metadata may specify a plurality of parameters, such as a type of blurring algorithm (e.g., box blur, Gaussian blur, etc.), a width of the blur (e.g., 64 pixels), an amount of blur to apply (e.g., 50%), a first length of time to apply the blur (e.g., 10 seconds), a second length of time to transition from the blurring algorithm to normal image data (e.g., 2.5 seconds), a type of transition (e.g., linear, smooth, etc.), and/or the like. However, the disclosure is not limited thereto and the parameters may vary without departing from the disclosure. For example, the metadata may not specify the first length of time to apply the blur and instead the extended camera service 316 may apply the blurring algorithm until it receives updated metadata instructing the extended camera service 316 to stop applying the blur. Additionally or alternatively, the second length of time may be omitted or equal to a value of zero, which instructs the extended camera service 316 to transition immediately from the blurred video data (e.g., applying the blurring algorithm) to the normal video data (e.g., not applying the blurring algorithm).

To illustrate an example, the extended camera service 316 may apply the blurring algorithm for the first length of time (e.g., 10 seconds) and then may smoothly transition from applying the blurring algorithm (e.g., blurred image data) to not applying the blurring algorithm (e.g., unblurred image data) over the second length of time (e.g., 2.5 seconds). The first device 102a may determine that the first length of time has elapsed after a connection has been established and the blurred image data has been sent from the first device 102a to the second device 102b. In some examples, the parameters may indicate to the extended camera service 316 the first amount of time and the second amount of time and the extended camera service 316 may transition from using the blurring algorithm to not using the blurring algorithm automatically. However, the disclosure is not limited thereto and in other examples, the extended camera service 316 may continue to apply the blurring algorithm until the application 210 instructs the extended camera service 316 to stop using the blurring algorithm without departing from the disclosure. For example, the application 210 may set first parameters at a first time, which instruct the extended camera service 316 to apply the blurring algorithm, and the extended camera service 316 may continue to apply the blurring algorithm until the application 210 sets second parameters at a second time, which instruct the extended camera service 316 not to apply the blurring algorithm.

Thus, the application 210 may vary the metadata in order to instruct the extended camera service 316 to vary the parameters of the image processing. To illustrate an example, the application 210 may set first metadata corresponding to first parameters at a first time (e.g., the first parameters corresponding to the first length of time), may set second metadata corresponding to second parameters at a second time (e.g., the second parameters corresponding to the second length of time), and may set third metadata corresponding to third parameters at a third time (e.g., the third parameters corresponding to normal video data where the blurring algorithm is not applied) without departing from the disclosure. However, this example is intended for illustrative purposes only and the application 210 may vary the metadata and/or parameters without departing from the disclosure.

While some of the examples described above refer to the metadata indicating a first length of time to apply a blurring algorithm or other processing, the disclosure is not limited thereto. Instead, the metadata may indicate that the blurring algorithm is to be applied, which will continue until the application determines that the blurring algorithm does not need to be applied. In some examples, the application 210 may set first metadata and initiate a timer, setting second metadata after the time expires. Thus, the application 210 may track the first period of time and then change the metadata to instruct the extended camera service 316 to stop applying the blurring algorithm after ten seconds has elapsed. In other examples, the application 210 may not set the second metadata until the application 210 determines that an instruction has been received that provides authorization to exit the privacy mode and send normal video data. As discussed above, the authorization may be explicit (e.g., user presses a button, issues a voice command or the like), implicit (e.g., user looks at the camera, two or more users are represented in the video data, or the like) and/or automatic (e.g., motion is detected, audio is detected or the like) based on user preferences. The authorization may vary based on the user preferences, which may allow implicit and/or automatic authorization only at certain times of the day, or between certain users and/or devices, or the like.

Figure 4:
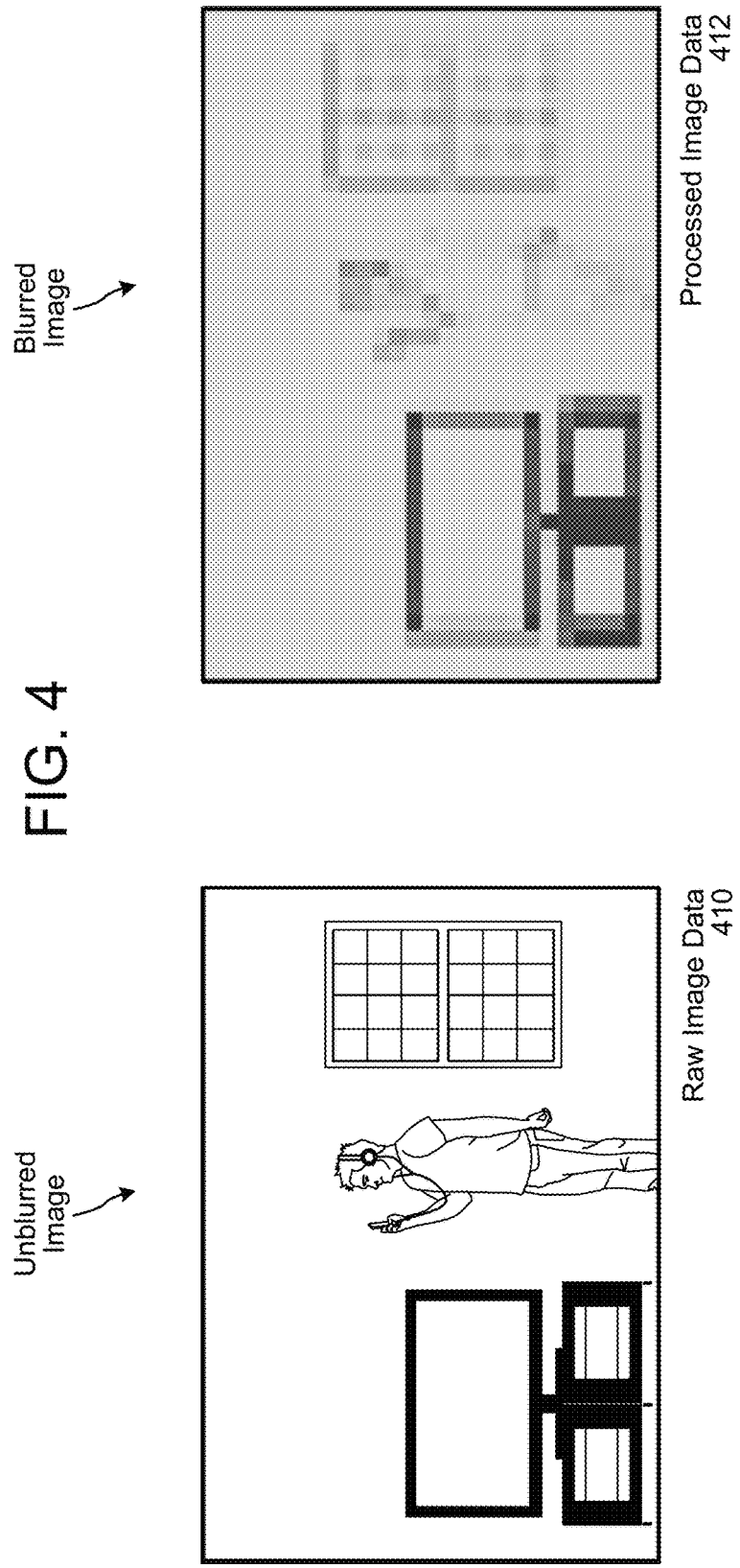
FIG. 4 illustrates examples of images sent with and without applying a blurring algorithm according to embodiments of the present disclosure.

FIG. 4 illustrates examples of images sent with and without applying a blurring algorithm according to embodiments of the present disclosure. As illustrated in FIG. 4, an unblurred image (e.g., raw image data 410) may be transformed to generate a blurred image (e.g., processed image data 412). The extended camera service 316 may apply the blurring algorithm to the raw image data 410 to generate the processed image data 412 using techniques known to one of skill in the art without departing from the disclosure. Thus, the extended camera service 316 may apply a blur filter to the raw image data to generate the processed image data, may apply a convolution matrix using a sliding window to generate the processed image data, and/or the like. For example, the extended camera service 316 may apply a box filter to generate a modified pixel value of a center pixel in a sliding window. The box filter may have a specified width (e.g., 64 pixels), which indicates that the extended camera service 316 generates the modified pixel value using a weighted sum average of a sliding window of 64 pixels by 64 pixels. This process is repeated for every pixel in the raw image data to generate blurred image data. In addition to applying the blurring algorithm, the extended camera service 316 may also apply a color filter to the blurred image data to generate the processed image data. For example, the color filter may reduce color values of the blurred image data such that the processed image data fades to various shades of gray (e.g., has a reduced range of colors). Thus, the processed image data is blurred spatially (e.g., to destroy spatial information and details of the image) and loses color information (e.g., fades to gray), which results in a "frosted glass" effect. The API 212 receives the processed image data 412 after the blurring algorithm (e.g., frosted glass effect) has been applied, instead of the raw image data 410.

In some examples, the application 210 may set the metadata by setting vendor extension metadata using a WebRTC's VideoCapturer class (e.g., setCameraMetadata (string metadata)). The metadata may specify parameters associated with a blurring algorithm, such as a type of blurring algorithm, an amount of blur to apply, a width of the blurring algorithm, and/or the like. Examples of vendor extension metadata are illustrated below:

1. [{Format:1.0},{NAME:FROST, STREAMS:1, EFFECT:box, STRENGTH:1.0, WIDTH:40, TRANSITION:linear, TIME:0.0}]
2. [{Format:1.0},{NAME:FROST, STREAMS:1, EFFECT:box, STRENGTH:0.0, WIDTH:40, TRANSITION:linear, TIME:5.0}]
3. [{Format: 1.0},{NAME:FROST, STREAMS:1, EFFECT:gaussian, STRENGTH:1.0, WIDTH:40, TRANSITION:linear, TIME:1.0}] [{FROST, STREAMS:1, EFFECT:other, STRENGTH: 1.0, TRANSITION:linear, TIME:1.0}]

The first example indicates that a frosted glass effect is applied immediately (e.g., time: 0.0) using a box blur, with a strength of 100% (e.g., 1.0), a width of 40 pixels, and a linear transition. The second example indicates that a frosted glass effect is applied that transitions smoothly (e.g., linearly) over 5 seconds (e.g., fading from a first strength of 100% to a second strength of 0%) using a box blur having a width of 40 pixels. The third example indicates that a frosted glass effect is generated by applying a Gaussian filter for 1 second, the Gaussian filter having a strength of 100% and a width of 40 pixels, before crossfading from the Gaussian filter to another effect (e.g., "other") over 1 second. Thus, the application 210 may pass multiple vendor extension metadata to generate various effects at different times.

In some examples, the API 212 may send video clarity metadata that may include callback information (e.g., information about the blurring algorithm being currently applied). As a first example, the callback information may correspond to a first string of information, such as [{0.3}, {FROST, gaussian, 0.0, 5.0}]. However, the disclosure is not limited thereto and as a second example, the callback information may correspond to a second string of information, such as [{Format:1.0},{NAME:FROST, STREAMS:1, STRENGTH:1.0, WIDTH:40, TRANSITION:linear, TIME: 1.0}, {FROST: CURRENT:1.0}]. Thus, the API 212 may indicate to the application 210 the type of blurring algorithm and/or any other image processing being applied by the extended camera service 316.

FIG. 5 illustrates an example of performing image processing according to embodiments of the present disclosure. As illustrated in FIG. 5, the extended camera service 316 may receive individual requests for image data from multiple applications and/or APIs at various times, such as a first application 210a, a second application 210b, and an API 212. While FIG. 5 illustrates the extended camera service 316 receiving requests for image data from the first application 210a, the second application 210b, and the API 212 to illustrate that the extended camera service 316 is used by multiple applications/APIs, the extended camera service 316 may only provide image data in response to a single request at a time. Thus, the extended camera service 316 may provide image data to the first application 210a or the second application 210b at different times, but not simultaneously.

The requests for image data may include metadata indicating parameters with which the extended camera service 316 may apply image processing to generate the processed image data. In some examples, such as during a communication session, the extended camera service 316 may generate first processed image data corresponding to the first color space (e.g., YUV) and second processed image data corresponding to the second color space (e.g., RGB). For example, FIG. 5 illustrates the extended camera service 316 sending YUV video data 510 to the second device 102b to be displayed on a second display 108b as remote image data 512 and displaying RGB video data 520 as preview image data 522 on a first display 108a of the first device 102a. While FIG. 5 illustrates the extended camera service 316 directly sending the YUV video data 510 to the second device 102b and/or the RGB video data 520 to the first display 108a, the disclosure is not limited thereto and the extended camera service 316 may send the YUV video data 510 and/or the RGB video data 520 to the requesting application 210 and/or API 212 (e.g., the first application 210a, the second application 210b, or the API 212 that sent the request for image data) without departing from the disclosure.

FIG. 6 is a communication diagram that illustrates performing image processing at a camera-level according to embodiments of the present disclosure. As illustrated in FIG. 6, the application 210 may set (610) metadata in the API 212 and the API 212 may request (612) frame data (e.g., a video frame) from the extended camera service 316, with the metadata embedded in at least one capture request.

In some examples, the API 212 may pass first metadata with a single capture request and the extended camera service 316 may apply the first metadata for multiple video frames (e.g., in response to subsequent capture requests that do not include any metadata) until the API 212 passes second metadata with a second capture request. Thus, the metadata is only sent from the API 212 to the extended camera service 316 as it is changed by the application 210. However, the disclosure is not limited thereto and the API 212 may send the first metadata with multiple capture requests and/or frame requests without departing from the disclosure. For example, the API 212 may send the first metadata with each frame request without departing from the disclosure.

While some of the examples described above refer to the metadata indicating a first length of time to apply a blurring algorithm or other processing, the disclosure is not limited thereto. Instead, the metadata may indicate that the blurring algorithm is to be applied, which will continue until the application determines that the blurring algorithm does not need to be applied. In some examples, the application 210 may set first metadata and initiate a timer, setting second metadata after the time expires. Thus, the application 210 may track the first period of time and then change the metadata to instruct the extended camera service 316 to stop applying the blurring algorithm after ten seconds has elapsed. In other examples, the application 210 may not set the second metadata until the application 210 determines that an instruction has been received that provides authorization to exit the privacy mode and send normal video data. As discussed above, the authorization may be explicit (e.g., user presses a button, issues a voice command or the like), implicit (e.g., user looks at the camera, two or more users are represented in the video data, or the like) and/or automatic (e.g., motion is detected, audio is detected or the like) based on user preferences. The authorization may vary based on the user preferences, which may allow implicit and/or automatic authorization only at certain times of the day, or between certain users and/or devices, or the like.

The metadata may indicate various parameters associated with the capture/frame request, such as a height, width, color space, etc. As the extended camera service 316 provides additional functionality, the metadata may include additional parameters to instruct the extended camera service 316 to perform additional image processing corresponding to the additional functionality. For example, the metadata may specify that the extended camera service 316 apply a blurring algorithm or the like to generate the blurred video data, along with additional parameters associated with the blurring algorithm (e.g., width and strength of blurring algorithm, type of blurring algorithm, transition time, transition type, etc.).

The extended camera service 316 may request (614) frame data from the camera HAL 218 and the camera HAL 218 may capture (616) raw frame data (e.g., a raw video frame) and send (618) the raw frame data to the extended camera service 316.

The extended camera service 316 may process (620) the raw frame data based on the metadata. For example, the extended camera service 316 may determine parameters associated with image processing that are indicated by the metadata and may apply the parameters to the raw frame data to generate a first processed video frame (e.g., using a first color space, such as YUV) and a second processed video frame (e.g., using a second color space, such as RGB). Thus, the extended camera service 316 may generate two video streams, with a first video stream (e.g., first processed video frame) being sent to a remote device and a second video stream (e.g., second processed video frame) being sent to a local display. However, the disclosure is not limited thereto and the extended camera service 316 may generate only a single processed video frame, which may be sent to both the remote device and the local display, without departing from the disclosure. For example, when both video streams use the same format and/or color space, the extended camera service 316 may generate a single processed video frame that is used for both video streams. Additionally or alternatively, the extended camera service 316 may generate only a single video stream without departing from the disclosure.

While the example illustrated above indicates that the first processed video frame and the second processed video frame are associated with two different color spaces, the disclosure is not limited thereto and the first processed video frame and the second processed video frame may have the same color space without departing from the disclosure. For example, the second processed video frame may have the first color space (e.g., YUV) and a component associated with the local display may use the second processed video frame to generate an output video frame having the second color space (e.g., RGB) to display on the local display.

The extended camera service 316 may send (622) the processed frame data to the API 212 and may send (624) video clarity metadata to the API 212. The API 212 may send (626) the processed frame data (e.g., first processed video frame) to the remote device and may send (628) the processed frame data (e.g., second processed video frame) to the local display. As discussed above, in some examples the extended camera service 316 may generate a single processed video frame and the API 212 may send the single processed video frame to both the remote device and the local display. The API 212 may also send (630) the video clarity metadata to the application 210 and the application 210 may adjust (632) the user interface (UI) as necessary.

For example, the video clarity metadata may indicate whether the video frames are blurred or unblurred, and the application 210 may indicate whether the video frames are blurred or unblurred using a visual indicator or the like.

In some examples, the extended camera service 316 may apply the blurring algorithm to a portion of the raw image data instead of an entirety of the raw image data. As a first example, the extended camera service 316 may apply the blurring algorithm to all but a portion of the raw image data, such that the processed image data is selectively unblurred. For example, the extended camera service 316 may apply the blurring algorithm to a background of an image but not to a foreground (e.g., subject) of the image, such as a user. This may be beneficial for situations where the user wants to obscure or blur the environment around the first device 102a, such as a messy room. As a second example, the extended camera service 316 may apply the blurring algorithm to only a portion of the raw image data, such that the processed image data is selectively blurred. For example, the extended camera service 316 may apply the blurring algorithm to a particular area in the image, such as a television, monitor, personal items, an area of a room (e.g., a bathroom), or the like. This may be beneficial for situations where the user wants to obscure or blur only a small portion of the environment around the first device 102a for privacy reasons, to avoid copyright infringement, or the like.

FIG. 7 illustrates examples of selectively unblurring and selectively blurring image data according to embodiments of the present disclosure. As illustrated in FIG. 7, raw image data 710 may be processed to generate selectively unblurred image data 712, which doesn't apply the blurring algorithm to a specific area (e.g., a user represented in the raw image data), or to generate selectively blurred image data 722, which applies the blurring algorithm to a specific area (e.g., a television represented in the raw image data).

The application 210 may indicate the specific area that is to be blurred or unblurred by a bounding box, which may be included in the metadata passed to the extended camera service 316. For example, the parameters may indicate the bounding box and whether the bounding box corresponds to an unblurred area (e.g., selectively unblurred image data 712) or a blurred area (e.g., selectively blurred image data 722). However, the disclosure is not limited to a single area and the parameters may indicate multiple bounding boxes corresponding to multiple areas to blur/unblur without departing from the disclosure. For ease of explanation, the specific area to be blurred or left unblurred is referred to as a bounding box. However, the bounding box is not limited to a rectangular shape and may instead correspond to individual pixels that may be blurred/unblurred. Thus, the bounding box may correspond to pixels associated with the user, the television or any other object without departing from the disclosure.

The application 210 and/or the first device 102a may generate the bounding box based on user preferences, an instruction received from the server(s) 112, an instruction received from the first user that is input to the first device 102a and/or a third device (e.g., smartphone associated with the first user), an instruction received from the second user that is input to the second device 102b and/or a fourth device (e.g., smartphone associated with the second user), or the like. For example, the first device 102a (e.g., the application 210 or a separate application) and/or the server(s) 112 may generate the bounding box based on distance information (e.g., indicating a distance to a subject and/or background of an image), based on computer vision, or the like. As another example, the first user may indicate the bounding box by selecting an area in the preview image data 522 on the first display 108a and/or by selecting an area in remote image data 512 displayed on a display of the third device. Similarly, the second user may indicate the bounding box by selecting an area of the remote image data 512 displayed on the second display 108b of the second device 102b and/or by selecting an area in remote image data 512 displayed on a display of the fourth device.

Figure 8A:
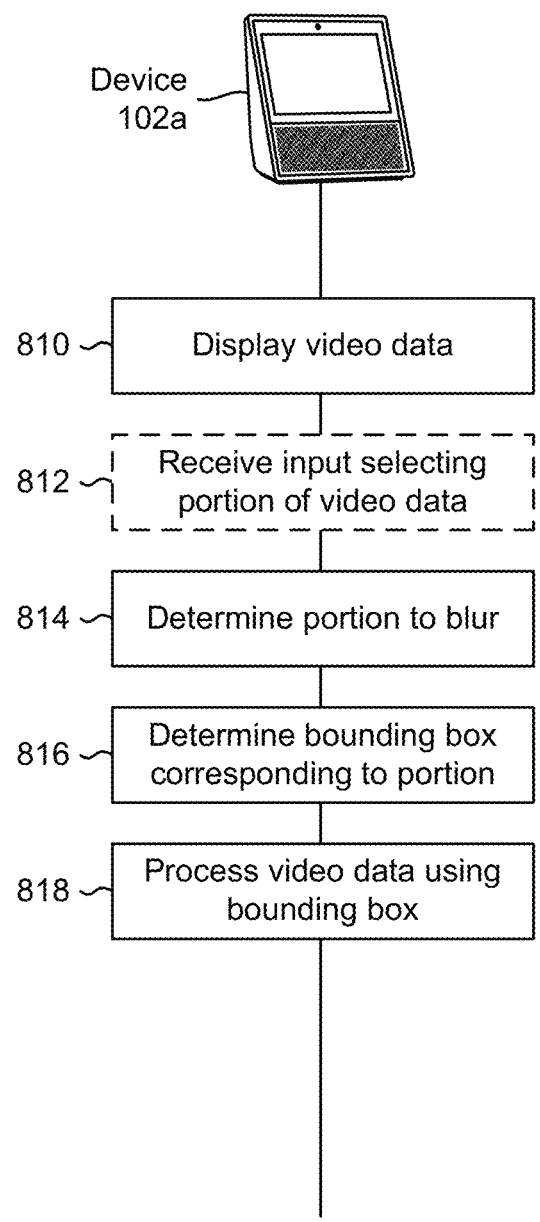

FIGS. 8A-8E are communication diagrams that illustrate selectively blurring image data according to embodiments of the present disclosure. To selectively blur image data, the extended camera service 316 may receive a bounding box indicating a portion of image data in which to apply a blurring algorithm. FIG. 8A illustrates an example of the first device 102a determining the bounding box, FIG. 8B illustrates an example of the server(s) 112 determining the bounding box, FIG. 8C illustrates an example of the second device 102b (e.g., remote device associated with a second user) determining the bounding box, FIG. 8D illustrates an example of a third device 102c (e.g., companion device associated with the first device 102a and/or the first user) determining the bounding box, and FIG. 8E illustrates an example of the third device 102c determining the bounding box.

FIG. 8A illustrates an example of the first device 102a determining the bounding box. As illustrated in FIG. 8A, the first device 102a may display (810) video data to a first user and may optionally receive (812) input selecting a portion of the video data. For example, the first user may input a command (e.g., using a touchscreen display or other input device) to the first device 102a indicating the portion of the video data to blur.

The first device 102a may determine (814) a portion of the video data to blur and may determine (816) a bounding box corresponding to the portion. When the first device 102a receives input selecting a first portion of the video data, the first device 102a may determine whether the first portion corresponds to the portion of the video data to blur (e.g., selectively blur) or whether areas outside of the first portion correspond to the portion of the video data to blur (e.g., selectively unblur).

If the first device 102a does not receive input selecting a portion of the video data, the first device 102a may apply computer vision or similar algorithms to determine the portion of the video data to blur. For example, the first device 102a may apply object recognition to identify regions of interest associated with humans, animals, objects or the like and may determine the bounding box based on the regions of interest. In some examples, the first device 102a may blur everything that is not a human, face, animal, preselected object or the like, although the disclosure is not limited thereto. For example, if the first device 102a detects the first user represented in the video data, the first device 102a may determine the bounding box such that it excludes the region of interest associated with the first user.

After determining the bounding box, the first device 102a may then process (818) the video data using the bounding box. For example, the application 210 may set metadata corresponding to the bounding box that indicates the portion of the video data and whether to blur or unblur the portion of the video data and the extended camera service 316 may apply the blurring algorithm based on the bounding box.

FIG. 8B illustrates an example of the server(s) 112 determining the bounding box. As illustrated in FIG. 8B, the first device 102a may send (820) video data to the server(s) 112 and the server(s) 112 may determine (822) a portion of the video data to blur, determine (824) a bounding box corresponding to the portion and may send (826) the bounding box to the first device 102a. The first device 102a may then process (818) the video data using the bounding box. For example, the application 210 may set metadata corresponding to the bounding box that indicates the portion of the video data and whether to blur or unblur the portion of the video data and the extended camera service 316 may apply the blurring algorithm based on the bounding box.

As discussed above with regard to FIG. 8A, if the server(s) 112 do not receive input selecting a portion of the video data, the server(s) 112 may apply computer vision or similar algorithms to determine the portion of the video data to blur. For example, the server(s) 112 may apply object recognition to identify regions of interest associated with humans, animals, objects or the like and may determine the bounding box based on the regions of interest. In some examples, the server(s) 112 may blur everything that is not a human, face, animal, preselected object or the like, although the disclosure is not limited thereto. For example, if the server(s) 112 detects the first user represented in the video data, the server(s) 112 may determine the bounding box such that it excludes the region of interest associated with the first user.

FIG. 8C illustrates an example of the second device 102b (e.g., remote device associated with the second user) determining the bounding box. As illustrated in FIG. 8C, the first device 102a may send (820) video data to the server(s) 112 and the server(s) 112 may send (830) the video data to the second device 102b. The second device 102b may display (832) the video data on the second display 108b, may receive (834) input selecting a portion of the video data (e.g., contact on the second display 108b or the like), may determine (836) a bounding box corresponding to the portion and may send (838) the bounding box to the server(s) 112. The server(s) 112 may send (826) the bounding box to the first device 102a, and the first device 102a may then process (818) the video data using the bounding box. For example, the application 210 may set metadata corresponding to the bounding box that indicates the portion of the video data and whether to blur or unblur the portion of the video data and the extended camera service 316 may apply the blurring algorithm based on the bounding box.

FIGS. 8D-8E illustrate examples of a third device 102c (e.g., companion device associated with the first device 102a and/or the first user) determining the bounding box. For example, the third device 102c may be associated with an account corresponding to the first device 102a. For example, the first user may indicate the bounding box on a smartphone. While FIGS. 8D-8E illustrate the first device 102a having a display, the disclosure is not limited thereto and the example illustrated in FIGS. 8D-8E is beneficial when the first device 102a does not include a display. As a result, the first user cannot see the video data using the first device 102a and therefore cannot select the bounding box, which is why the first user uses the third device 102c instead.

As illustrated in FIG. 8D, the first device 102a may send (820) video data to the server(s) 112. The third device 102c may detect (850) a command requesting to display the video data and may send (852) a request for the video data to the server(s) 112. The server(s) 112 may verify (854) an authorization (e.g., determine that the third device 102c is authorized to receive the video data) and may send (856) the video data to the third device 102c. The third device 102c may display (858) the video data on a display, may receive (860) input selecting a portion of the video data (e.g., contact on the display or the like), may determine (862) a bounding box corresponding to the portion and may send (864) the bounding box to the server(s) 112. The server(s) 112 may send (826) the bounding box to the first device 102*a*, and the first device 102*a* may then process (818) the video data using the bounding box. For example, the application 210 may set metadata corresponding to the bounding box that indicates the portion of the video data and whether to blur or unblur the portion of the video data and the extended camera service 316 may apply the blurring algorithm based on the bounding box.

As illustrated in FIG. 8E, the third device 102*c* may detect (870) a command requesting to display the video data and may send (872) a request for the video data to the first device 102*a*. The first device 102*a* may verify (874) an authorization (e.g., determine that the third device 102*c* is authorized to receive the video data) and may send (876) the video data to the third device 102*c*. The third device 102*c* may display (878) the video data on a display, may receive (880) input selecting a portion of the video data (e.g., contact on the display or the like), may determine (882) a bounding box corresponding to the portion and may send (884) the bounding box to the first device 102*a*. The first device 102*a* may then process (818) the video data using the bounding box. For example, the application 210 may set metadata corresponding to the bounding box that indicates the portion of the video data and whether to blur or unblur the portion of the video data and the extended camera service 316 may apply the blurring algorithm based on the bounding box.

While FIGS. 8C-8E indicate the second device 102*b* and/or the third device 102*c* receiving input selecting the portion of the video data, the disclosure is not limited thereto. In some examples, the second device 102*b* and/or the third device 102*c* may determine the portion of the video data at least in part using computer vision, as discussed in greater detail above with regard to step 814.

FIG. 9 illustrates an example of performing image processing at a camera-level during a communication session (e.g., videoconference). As illustrated in FIG. 9, the application 210 may initiate the communication session and pass metadata with at least one request for a video frame from the camera HAL 218. As the extended camera service 316 is running on top of the camera HAL 218, the extended camera service 316 may receive the request for video frames and may request video frames from the camera HAL 318. The camera HAL 318 may capture raw video frames (e.g., raw image data corresponding to an unblurred image) and send the raw video frames to the extended camera service 316.

The metadata may indicate various parameters associated with the capture/frame request, such as a height, width, color space, etc. As the extended camera service 316 provides additional functionality, the metadata may include additional parameters to instruct the extended camera service 316 to perform additional image processing corresponding to the additional functionality. For example, the metadata may specify that the extended camera service 316 apply a blurring algorithm or the like to generate the blurred video data, along with additional parameters associated with the blurring algorithm (e.g., width and strength of blurring algorithm, type of blurring algorithm, transition time, transition type, etc.).

While some of the examples described above refer to the metadata indicating a first length of time to apply a blurring algorithm or other processing, the disclosure is not limited thereto. Instead, the metadata may indicate that the blurring algorithm is to be applied, which will continue until the application determines that the blurring algorithm does not need to be applied. In some examples, the application 210 may set first metadata and initiate a timer, setting second metadata after the time expires. Thus, the application 210 may track the first period of time and then change the metadata to instruct the extended camera service 316 to stop applying the blurring algorithm after ten seconds has elapsed. In other examples, the application 210 may not set the second metadata until the application 210 determines that an instruction has been received that provides authorization to exit the privacy mode and send normal video data. As discussed above, the authorization may be explicit (e.g., user presses a button, issues a voice command or the like), implicit (e.g., user looks at the camera, two or more users are represented in the video data, or the like) and/or automatic (e.g., motion is detected, audio is detected or the like) based on user preferences. The authorization may vary based on the user preferences, which may allow implicit and/or automatic authorization only at certain times of the day, or between certain users and/or devices, or the like.

The extended camera service 316 may determine the parameters for image processing indicated by the metadata and may apply the image processing to the raw video frames to generate processed video frames (e.g., processed image data corresponding to a blurred image), which it sends to the application 210. The application 210 may send the processed video frames to the remote device (e.g., second device 102*b*) and/or to a local display (e.g., display 108 on the first device 102*a*). Thus, the first device 102*a* may display to the first user the same blurred image that is displayed on the second device 102*b*. In addition, the application 210 may adjust the user interface (UI) as necessary.

As illustrated in FIG. 9, the application 210 may receive the processed video frames and may send the processed video frames to the remote device and/or the local display. For example, the application 210 may engage in a communication session without using WebRTC or the like, instead sending the processed video frames directly to the remote device and/or the local display. Thus, FIG. 9 illustrates the application 210 communicating directly with the extended camera service 316 without including the API 212. However, the disclosure is not limited thereto and the API 212 may be included between the application 210 and the extended camera service 316. However, in contrast to the example illustrated in FIG. 3B, the API 212 may send the processed video frames to the application 210 and the application 210 may send the processed video frames to the remote device and/or the local display.

In some examples, the extended camera service 316 may be configured to generate the processed image data using a blurring algorithm by default. For example, the extended camera service 316 may generate the processed image data using a blurring algorithm unless the extended camera service 316 receives a token or other authorization from the application 210. After receiving the token or other authorization, the extended camera service 316 may generate the processed image data without using the blurring algorithm for a limited duration of time. Thus, the system 100 may only generate and/or send unblurred image data when tokens are received, allowing the system 100 to control exactly when the image data is unblurred. This may be used to increase privacy settings of the device 102 and avoid unwanted applications from accessing unblurred image data without the user's permission.

Figure 10A:
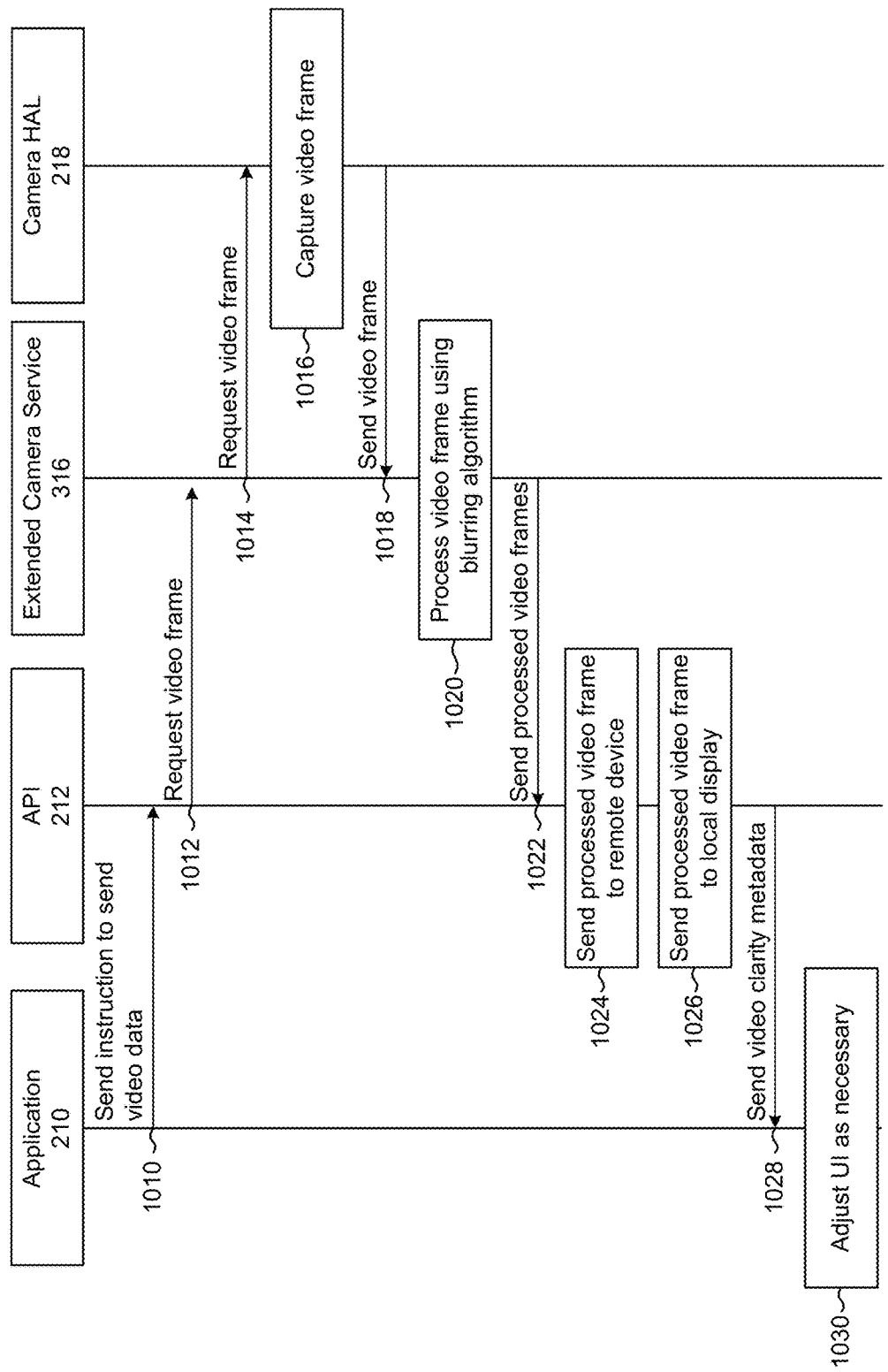
Figure 10B:
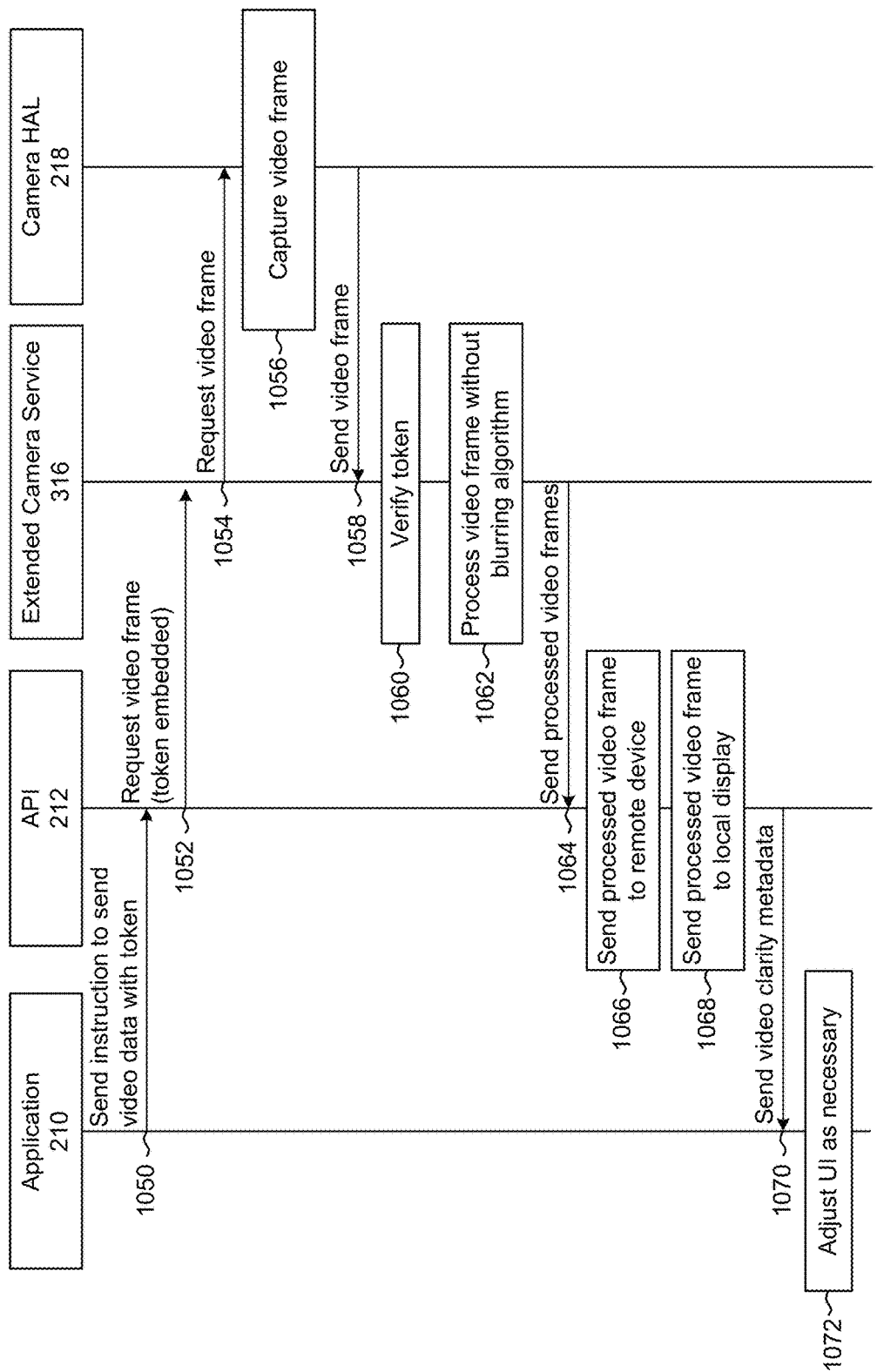

FIGS. 10A-10C are communication diagrams that illustrate using a token to authorize generating image data without a blurring algorithm according to embodiments of the present disclosure. FIG. 10A is a communication diagram that illustrates using the blurring algorithm by default. As illustrated in FIG. 10A, the application 210 may send (1010) an instruction to send video data to the API 212 and the API 212 may request (1012) a video frame from the extended camera service 316. The extended camera service 316 may request (1014) a video frame from the camera HAL 218 and the camera HAL 218 may capture (1016) a raw video frame and send (1018) the raw video frame to the extended camera service 316. The camera service 316 may process (1020) the raw video frame using a blurring algorithm with default parameters. For example, the extended camera service 316 may apply the default parameters to the raw video frame to generate a first processed video frame using a first color space (e.g., YUV) and a second processed video frame using a second color space (e.g., RGB). In some examples, the extended camera service 316 may apply the blurring algorithm to only a portion of the raw video frame based on a bounding box, as discussed in greater detail above.

The extended camera service 316 may send (1022) the processed video frames to the API 212 and the API 212 may send (1024) the first processed video frame to the remote device and may send (1026) the second processed video frame to the local display. The API 212 may also send (1028) video clarity metadata to the application 210 and the application 210 may adjust (1030) the user interface (UI) as necessary. For example, the video clarity metadata may indicate whether the video frames are blurred or unblurred, and the application 210 may indicate whether the video frames are blurred or unblurred using a visual indicator or the like.

FIG. 10B is a communication diagram that illustrates providing a token to authorize sending unblurred image data. As illustrated in FIG. 10B, the application 210 may send (1050) an instruction to send video data with a token to the API 212 and the API 212 may request (1052) a video frame from the extended camera service 316, with the token embedded in the request. The extended camera service 316 may request (1054) a video frame from the camera HAL 218 and the camera HAL 218 may capture (1056) a raw video frame and send (1058) the raw video frame to the extended camera service 316. The extended camera service 316 may verify (1060) the token and may process (1062) the raw video frame based on second parameters (e.g., without using the blurring algorithm). For example, the extended camera service 316 may apply the second parameters to the raw video frame to generate a first processed video frame using a first color space (e.g., YUV) and a second processed video frame using a second color space (e.g., RGB). The extended camera service 316 may send (1064) the processed video frames to the API 212 and the API 212 may send (1066) the first processed video frame to the remote device and may send (1068) the second processed video frame to the local display. Thus, the remote device and the local display may receive unblurred image data from the API 212. The API 212 may also send (1070) video clarity metadata to the application 210 and the application 210 may adjust (1072) the user interface (UI) as necessary. For example, the video clarity metadata may indicate whether the video frames are blurred or unblurred, and the application 210 may indicate whether the video frames are blurred or unblurred using a visual indicator or the like.

FIG. 10C is a communication diagram that illustrates providing a token to authorize sending unblurred image data without using the API 210. As illustrated in FIG. 10C, the application 210 may request (1080) a video frame from the extended camera service 316, with the token embedded in the request. The extended camera service 316 may request (1082) a video frame from the camera HAL 218 and the camera HAL 218 may capture (1084) a raw video frame and send (1086) the raw video frame to the extended camera service 316. The extended camera service 316 may verify (1088) the token and may process (1090) the raw video frame based on second parameters (e.g., without using the blurring algorithm). For example, the extended camera service 316 may apply the second parameters to the raw video frame to generate a first processed video frame using a first color space (e.g., YUV) and a second processed video frame using a second color space (e.g., RGB). The extended camera service 316 may send (1092) the processed video frames to the application 210 and the application 210 may send (1094) the first processed video frame to the remote device and may send (1096) the second processed video frame to the local display. Thus, the remote device and the local display may receive unblurred image data from the application 210. The application 210 may adjust (1098) the user interface (UI) as necessary. For example, the application 210 may indicate whether the video frames are blurred or unblurred using a visual indicator or the like.

The server(s) 112 may include or refer to data regarding user accounts, shown by the user profile storage 1102 illustrated in FIG. 11. The user profile storage 1102 may be located proximate to server(s) 112, or may otherwise be in communication with various components, for example over network(s) 10. The user profile storage 1102 may include a variety of information related to individual users, households, accounts, etc. that interact with the system 100. For illustration, as shown in FIG. 11, the user profile storage 1102 may include data regarding the devices associated with particular individual user accounts 1104. In an example, the user profile storage 1102 is a cloud-based storage. Such data may include device identifier (ID) and internet protocol (IP) address information for different devices as well as names by which the devices may be referred to by a user. Further qualifiers describing the devices may also be listed along with a description of the type of object of the device.

Further, the user account 1104 may include or be associated with different user preferences, such as an amount of blurring corresponding to the blurring algorithm, a width associated with the blurring algorithm, a first duration of time to blur image data using the blurring algorithm, a second duration of time with which to transition from blurred image data to unblurred image data, bounding boxes indicating a portion of image data in which to apply or not apply the blurring algorithm, devices 102 and/or users that can establish a videoconference without requiring an explicit authorization from the user, etc. For example, close friends and family may provide permission to each other to initiate a videoconference without requiring acknowledgement in order to facilitate communication. Thus, the user preferences may indicate that a device may enter the privacy mode in response to a request to videoconference from a first user but not from a second user, or may indicate a first level of blur associated with the first user and a second level of blur associated with the second user to increase a level of privacy when sending video data to the second user.

In some examples, the user account 1104 may include or be associated with user preferences indicating parameters to be applied to video frames that were created and stored during previous communication sessions. For example, the user may indicate a bounding box indicating a portion of the image data to apply the blurring algorithm and other parameters associated with the blurring algorithm and the device 102 may store the bounding box and other parameters for subsequent communication sessions. Thus, the next time the user initiates a communication session, the device 102 may apply the stored parameters without requiring the user to indicate the bounding box or anything else. A device 102 may refer to the user account 1104 and corresponding data (e.g., user preferences) in order to configure settings for an individual user of the device 102.

Figure 12:
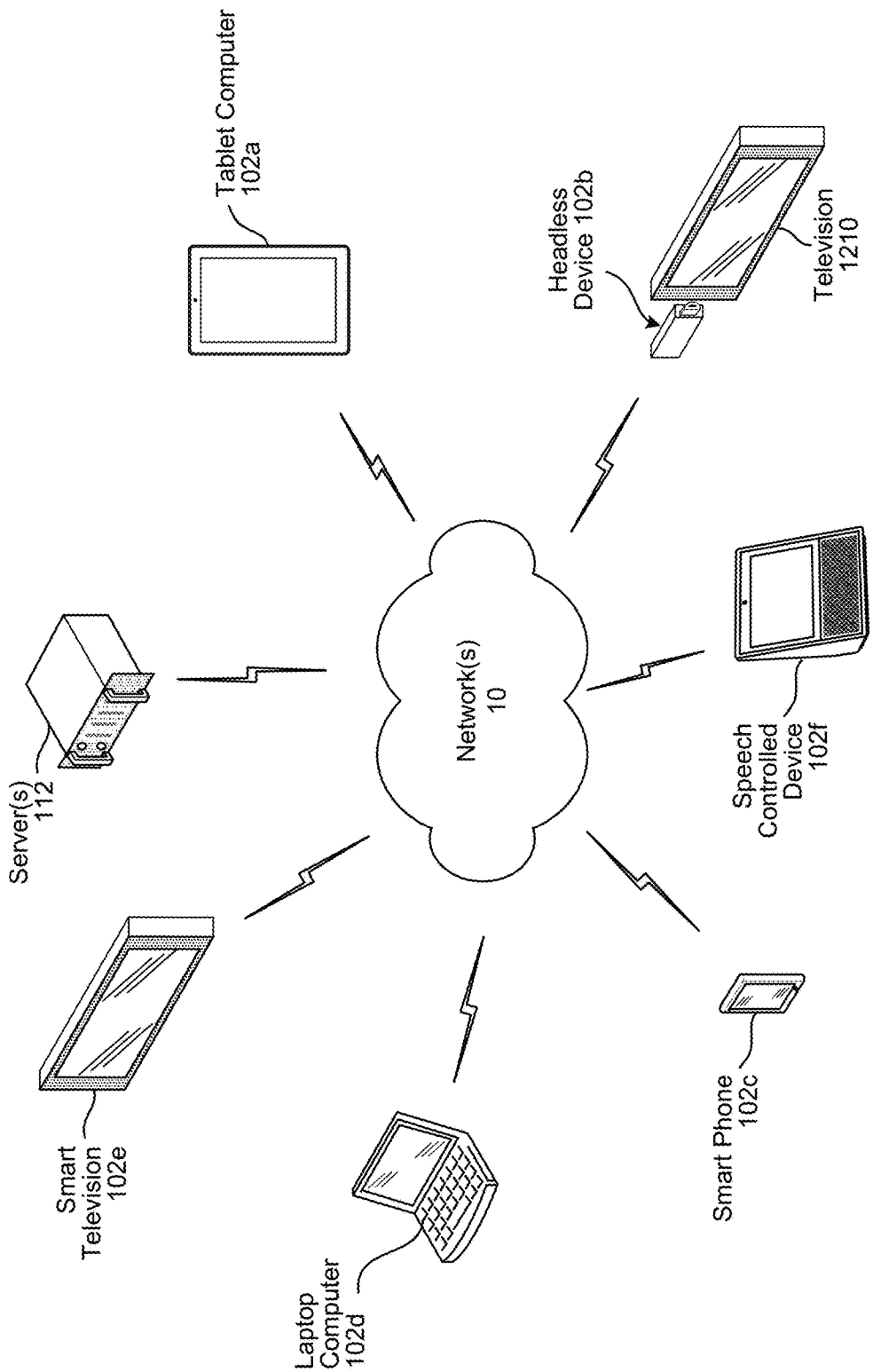
FIG. 12 illustrates an example of a computer network for use with the system.

As illustrated in FIG. 12 devices 102 may contain components of the system 100 and may be connected over network(s) 10. The network(s) 10 may be a local or private network or may be part of a wider network. Devices 102 may be connected to the network(s) 10 through either wired or wireless connections. For example, a tablet computer 102*a*, a headless device 102*b*, a smart phone 102*c*, a laptop computer 102*d*, a smart television 102*e*, and/or speech controlled device 102*f*, may be connected to the network(s) 10 through a wired and/or wireless connection.

Figure 13:
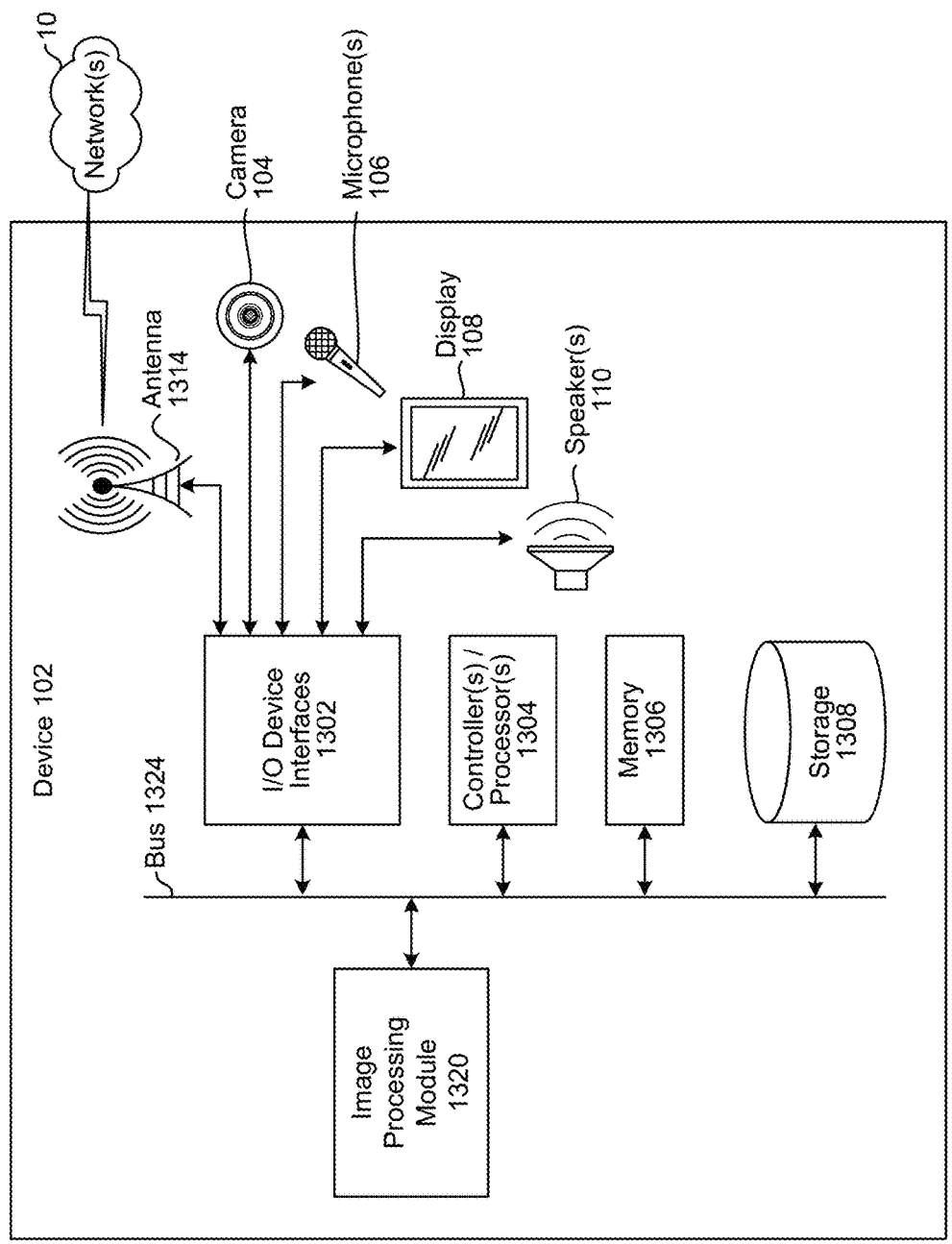
FIG. 13 is a block diagram conceptually illustrating example components of a device according to embodiments of the present disclosure.

FIG. 13 illustrates a block diagram conceptually illustrating example components of a device 102 according to the present embodiments. In operation, the device 102 may include computer-readable and computer-executable instructions that reside in storage 1308 on the device 102. The device 102 may be an electronic device capable of connecting to a wired or wireless network. Examples of electronic devices may include computers (e.g., a desktop, a laptop, a server or the like), portable devices (e.g., a camera, smart phone, tablet or the like), media devices (e.g., televisions, headless devices, video game consoles or the like) or the like. The device 102 may also be a component of any of the abovementioned devices or systems.

As illustrated in FIG. 13, the device 102 may include an address/data bus 1324 for conveying data among components of the device 102. Each component within the device 102 may also be directly connected to other components in addition to (or instead of) being connected to other components across the bus 1324.

The device 102 may include one or more controllers/processors 1304 comprising one-or-more central processing units (CPUs) for processing data and computer-readable instructions and a memory 1306 for storing data and instructions. The one or more controllers/processors 1304 may include CPU 430 and a graphics processing unit (GPU) 420. The memory 1306 may include volatile random access memory (RAM), non-volatile read only memory (ROM), non-volatile magnetoresistive (MRAM) and/or other types of memory. The device 102 may also include a data storage component 1308 for storing data and processor-executable instructions. The data storage component 1308 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 1302.

The device 102 includes input/output device interfaces 1302. The input/output device interfaces 1302 may be configured to operate with network(s) 10, for example a wireless local area network (WLAN) (such as WiFi), a local area network (LAN), Bluetooth, zigbee and/or wireless networks, such as a Long Term Evolution (LTE) network, WiMAX network, 3G network, etc. The network(s) 10 may include a local or private network or may include a wide network such as the internet. Devices may be connected to the network(s) 10 through a wired or wireless connection.

The input/output device interfaces 1302 may also include an interface for an external peripheral device connection such as universal serial bus (USB), FireWire, Thunderbolt, Ethernet port or other connection protocol that may connect to networks 10. The input/output device interfaces 1302 may be configured to operate with a camera 104, microphone(s) 106, a display 108 and/or speaker(s) 110, although the disclosure is not limited thereto.

The device 102 further includes a privacy mode module 1320, which may comprise processor-executable instructions stored in storage 1308 to be executed by controller(s)/processor(s) 1304 (e.g., software, firmware), hardware, or some combination thereof. For example, components of the privacy mode module 1320 may be part of a software application running in the foreground and/or background on the device 102. The privacy mode module 1320 may control the device 102 as discussed above, for example with regard to FIGS. 1, 3B, 6, 8A-8C, 9, and/or 10A-10C. Some or all of the controllers/modules of the privacy mode module 1320 may be executable instructions that may be embedded in hardware or firmware in addition to, or instead of, software. In one embodiment, the device 102 may operate using an Android operating system (such as Android 4.3 Jelly Bean, Android 4.4 KitKat or the like), an Amazon operating system (such as FireOS or the like), or any other suitable operating system.

Executable computer instructions for operating the device 102 and its various components may be executed by the controller(s)/processor(s) 1304, using the memory 1306 as temporary "working" storage at runtime. The executable instructions may be stored in a non-transitory manner in non-volatile memory 1306, storage 1308, or an external device. Alternatively, some or all of the executable instructions may be embedded in hardware or firmware in addition to or instead of software.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving an indication indicating a portion of first image data;
   sending, by an application to a camera service component, a request for image data, the request including first parameters that include pixel information corresponding to the portion of the first image data;
   sending, by the camera service component to an image sensor component, an instruction to send first raw image data generated by the image sensor component;
   receiving, by the camera service component from the image sensor component, the first raw image data;
   determining, by the camera service component based on the pixel information, a portion of the raw image data to which to apply a blurring algorithm;
   determining, by the camera service component, a first strength value indicating an amount of blur to apply using the blurring algorithm;
   determining, by the camera service component, a first width value indicating a number of pixels associated with the blurring algorithm;
   generating blurred image data by applying, by the camera service component, the blurring algorithm to the portion of the first raw image data using the first strength value and the first width value to blur the portion of the first raw image data, a portion of the blurred image data blurred relative to the portion of the first raw image data;
   generating first processed image data by applying, by the camera service component, a color filter to at least a portion of the blurred image data, the color filter modifying color values of the blurred image data; and
   sending, by the camera service component, the first processed image data.

2. The computer-implemented method of claim 1, further comprising:
   displaying the first image data on a touchscreen display;
   receiving, via touch input on the touchscreen display, the indication indicating the portion of the first image data; and
   determining the pixel information corresponding to the portion of the first image data.

3. The computer-implemented method of claim 1, further comprising:
   connecting to a remote device via a wireless link;
   sending the first image data to the remote device via the wireless link;
   receiving, from the remote device, the indication indicating the portion of the first image data; and
   determining the pixel information corresponding to the portion of the first image data.

4. The computer-implemented method of claim 1, further comprising:
   sending the first image data to one or more servers;
   receiving, from the one or more servers, an instruction to blur the portion of the first image data;
   receiving, from the one or more servers, the indication indicating the portion of the first image data; and
   determining the pixel information corresponding to the portion of the first image data.

5. A computer-implemented method, comprising:
   receiving an indication indicating a portion of first image data;
   sending, by an application, a request for image data, the request including first parameters that include pixel information corresponding to the portion of the first image data;
   sending, to an image sensor component, an instruction to send first raw image data;
   receiving, from the image sensor component, the first raw image data;
   determining, based on the pixel information, a portion of the raw image data to which to apply a blurring algorithm;
   generating first processed image data by applying, by a camera service component, the blurring algorithm to the portion of the first raw image data to blur the portion of the first raw image data, the camera service component being configured to forward requests for raw image data from the application to the image sensor component; and
   sending, by the camera service component, the first processed image data.

6. The computer-implemented method of claim 5, further comprising, by the camera service component:

determining a first strength value indicating the amount of blur to apply using the blurring algorithm;

determining a first width value indicating a number of pixels associated with the blurring algorithm;

generating blurred image data by applying the blurring algorithm to the portion of the first raw image data using the first strength value and the first width value; and generating the first processed image data by applying a color filter to at least a portion of the blurred image data, the color filter modifying color values of the blurred image data.

7. The computer-implemented method of claim 5, further comprising, by the camera service component:

determining, based on the pixel information, a second portion of the first raw image data that corresponds to the portion of the first image data;

determining the portion of the first raw image data that is not included in the second portion of the first raw image data; and generating the first processed image data by applying the blurring algorithm to the portion of the first raw image data.

8. The computer-implemented method of claim 5, further comprising:

determining, using computer vision processing, a region of interest represented in the first image data;

determining the portion of the first image data corresponding to the region of interest; and determining the pixel information corresponding to the portion of the first image data.

9. The computer-implemented method of claim 5, further comprising:

displaying the first image data on a touchscreen display;

receiving, via touch input on the touchscreen display, the indication indicating the portion of the first image data; and determining the pixel information corresponding to the portion of the first image data.

10. The computer-implemented method of claim 5, further comprising:

connecting to a remote device via a wireless link;

sending the first image data to the remote device via the wireless link; and receiving, from the remote device, the indication indicating the portion of the first image data.

11. The computer-implemented method of claim 5, further comprising:

sending the first image data to one or more servers;

receiving, from the one or more servers, an instruction to blur the portion of the first image data; and receiving, from the one or more servers, the indication indicating the portion of the first image data.

12. The computer-implemented method of claim 5, further comprising:

sending, by the first application to an application programming interface (API), the request;

generating, by the first application, a bounding box corresponding to at least a portion of a display;

sending, by the API to the camera service component, the request;

sending, by the camera service component to the API, the first processed image data;

sending, by the API, the first processed image data to the remote device; and displaying, using the API, second image data corresponding to the first processed image data in the bounding box on the display.

13. A first device, comprising:

at least one processor; and memory including instructions operable to be executed by the at least one processor to cause the first device to:

receive an indication indicating a portion of first image data;

send, by an application to a camera service component, a request for image data, the request including first parameters that include pixel information corresponding to the portion of the first image data;

send, by the camera service component to an image sensor component, an instruction to send first raw image data;

receive, by the camera service component from the image sensor component, the first raw image data;

determine, by the camera service component based on the pixel information, a portion of the raw image data to which to apply a blurring algorithm;

generate first processed image data by applying, by the camera service component and using first parameters, the blurring algorithm to the portion of the first raw image data to blur the portion of the first raw image data, wherein the first parameters include a first strength value indicating an amount of blur to apply using the blurring algorithm; and send, by the camera service component, the first processed image data.

14. The first device of claim 13, wherein the memory further comprises instructions that, when executed by the at least one processor, further cause the first device to:

determine the first strength value indicating the amount of blur to apply using the blurring algorithm;

determine a first width value indicating a number of pixels associated with the blurring algorithm;

generate blurred image data by applying the blurring algorithm to the portion of the first raw image data using the first strength value and the first width value; and generate the first processed image data by applying a color filter to at least a portion of the blurred image data, the color filter modifying color values of the blurred image data.

15. The first device of claim 13, wherein the memory further comprises instructions that, when executed by the at least one processor, further cause the first device to:

determine, based on the pixel information, a second portion of the first raw image data that corresponds to the portion of the first image data;

determine the portion of the first raw image data that is not included in the second portion of the first raw image data; and generate the first processed image data by applying the blurring algorithm to the portion of the first raw image data.

16. The first device of claim 13, wherein the memory further comprises instructions that, when executed by the at least one processor, further cause the first device to:

determine, using computer vision processing, a region of interest represented in the first image data;

determine the portion of the first image data corresponding to the region of interest; and determine the pixel information corresponding to the portion of the first image data.

17. The first device of claim 13, wherein the memory further comprises instructions that, when executed by the at least one processer, further cause the first device to:
  display the first image data on a touchscreen display;
  receive, via touch input on the touchscreen display, the indication indicating the portion of the first image data; and
  determine the pixel information corresponding to the portion of the first image data.

18. The first device of claim 13, wherein the memory further comprises instructions that, when executed by the at least one processer, further cause the first device to:
  connect to a remote device via a wireless link;
  send the first image data to the remote device via the wireless link; and
  receive, from the remote device, the indication indicating the portion of the first image data.

19. The first device of claim 13, wherein the memory further comprises instructions that, when executed by the at least one processer, further cause the first device to:
  send the first image data to one or more servers;
  receive, from the one or more servers, an instruction to blur the portion of the first image data; and
  receive, from the one or more servers, the indication indicating the portion of the first image data.

20. The first device of claim 13, wherein the memory further comprises instructions that, when executed by the at least one processer, further cause the first device to:
  send, by the first application to an application programming interface (API), the request;
  generate, by the first application, a bounding box corresponding to at least a portion of a display;
  send, by the API to the camera service component, the request;
  send, by the camera service component to the API, the first processed image data;
  send, by the API, the first processed image data to the remote device; and
  display, using the API, second image data corresponding to the first processed image data in the bounding box on the display.

21. The computer-implemented method of claim 5, wherein generating the first processed image data further comprises:
  determining a first strength value indicating an amount of blur to apply using the blurring algorithm;
  determining one or more first parameters corresponding to the blurring algorithm; and
  generating the first processed image data by applying the blurring algorithm to the first raw image data using the first strength value and the one or more first parameters.

* * * * *